(12) United States Patent
Leibler et al.

(10) Patent No.: US 10,584,190 B2
(45) Date of Patent: *Mar. 10, 2020

(54) COMPOSITION COMPRISING A CROSS-LINKED POLYMER NETWORK, PREPARED BY RADICAL COPOLYMERISATION, COMPRISING PENDING LINKS AND CROSS-LINKS EXCHANGEABLE BY ALDEHYDE-IMINE EXCHANGE REACTIONS AND/OR BY IMINE-IMINE EXCHANGE REACTIONS, PREPARATION PROCESS AND USE

(71) Applicant: ECOLE SUPERIEURE DE PHYSIQUE ET DE CHIMIE INDUSTRIELLES DE LA VILLE DE PARIS, Paris (FR)

(72) Inventors: Ludwik Leibler, Paris (FR); Renaud Nicolay, Verrieres-le-Buisson (FR); Max Rottger, Paris (FR)

(73) Assignee: ECOLE SUPERIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 489 days.

This patent is subject to a terminal disclaimer.

(21) Appl. No.: 15/239,000

(22) Filed: Aug. 17, 2016

(65) Prior Publication Data
US 2017/0051083 A1 Feb. 23, 2017

(30) Foreign Application Priority Data
Aug. 17, 2015 (FR) ...................... 15 57768

(51) Int. Cl.
| | |
|---|---|
| C08F 212/08 | (2006.01) |
| C08F 220/14 | (2006.01) |
| C08F 220/16 | (2006.01) |
| C08F 293/00 | (2006.01) |
| C08F 8/30 | (2006.01) |
| C08F 12/22 | (2006.01) |
| C08F 12/26 | (2006.01) |
| C08F 212/34 | (2006.01) |

(52) U.S. Cl.
CPC .............. *C08F 8/30* (2013.01); *C08F 212/08* (2013.01); *C08F 220/14* (2013.01); *C08F 220/16* (2013.01); *C08F 293/005* (2013.01); *C08F 12/22* (2013.01); *C08F 12/26* (2013.01); *C08F 212/34* (2013.01)

(58) Field of Classification Search
CPC ....... C08J 3/00; C08J 3/24; C08J 3/243; C08J 3/246; C08K 5/04; C08K 5/07; C08K 5/16; C08K 5/29; C08F 212/08; C08F 220/14; C08F 220/16; C08F 293/005; C08F 8/30; C08F 12/22; C08F 12/26; C08F 212/34

See application file for complete search history.

(56) References Cited

U.S. PATENT DOCUMENTS

| | | |
|---|---|---|
| 2011/0319524 A1 | 12/2011 | Leibler et al. |
| 2013/0300020 A1 | 11/2013 | Leibler et al. |

FOREIGN PATENT DOCUMENTS

| | | |
|---|---|---|
| WO | WO 2011/151584 A1 | 12/2011 |
| WO | WO 2012/101078 A1 | 8/2012 |

OTHER PUBLICATIONS

Bruno et al., "Use of Niobium(III) and Niobium(V) Compounds in Catalytic Imine Metathesis under Mild Conditions," Organometallics, vol. 19, No. 23, 2000 (Published on Web, Oct. 14, 2000), pp. 4672-4674.
Cantrell et al., "Catalytic C=N Bond Formation by Metal-Imide-Mediated Imine Metathesis," J. Am. Chem. Soc., vol. 120, No. 32, 1998 (Published on Web Jul. 30, 1998), pp. 8035-8042.
Cantrell et al., "Transition-Metal-Catalyzed Imine Metathesis," Organometallics, vol. 16, No. 25, Dec. 9, 1997, pp. 5381-5383.
Chow et al., "Crystallization-driven Constitutional Changes of Dynamic Polymers in Response to neat/solution Conditions," Chem. Commun., 2007 (Published as Advanced Article on the web Oct. 4, 2007), pp. 4363-4365, XP-55243335A.
Crivello et al., "Some Selected Schiff-Based Exchange Reactions," Eighty-first Annual Meeting of the Indiana Academy of Science at the University of Notre Dame, Notre Dame, Indiana Oct. 7-9, 1965 as Paper No. 14 in the Chemistry Division, pp. 1-7, XP-55243688A.
French Preliminary Search Report, dated Feb. 8, 2016, for French Application No. 1557768.
Giuseppone et al., "Scandium(III) Catalysis of Transimination Reactions. Independent and Constitutionally Coupled Reversible Processes," J. Am. Chem. Soc., vol. 127, No. 15, 2005 (Published on Web Mar. 22, 2005), pp. 5528-5539.

(Continued)

*Primary Examiner* — Irina S Zemel
*Assistant Examiner* — Jeffrey S Lenihan
(74) *Attorney, Agent, or Firm* — Birch, Stewart, Kolasch & Birch, LLP

(57) ABSTRACT

Disclosed is a composition including a network of cross-linked polymers. The network is prepared by one of the following radical copolymerisations. First, there is copolymerization of monomers, polymer of interest precursors, the monomers carrying at least one functional group that is polymerisable by radical polymerization. Second, there is copolymerization of monomers comprising at least one pending imine group and carrying at least one functional group that is polymerisable by radical polymerisation; and/or monomers comprising at least one pending aldehyde group and carrying at least one functional group that is polymerisable by radical polymerization. Third, there is a copolymerization of a cross-linking agent comprising aldehyde and/or imine groups enabling the formation of a cross-linked polymer network containing pending functions and cross-links that are exchangeable by aldehyde-imine exchange reactions and/or by imine-imine exchange reactions.

29 Claims, 2 Drawing Sheets

(56) References Cited

OTHER PUBLICATIONS

He et al., "Direct Synthesis of Controlled-Structure Primary Amine-Based Methacrylic Polymers by Living Radical Polymerization," Macromolecules, vol. 40, No. 13, 2007 (Published on Web, May 23, 2007), pp. 4429-4438.

International Search Report and Written Opinion of the International Searching Authority (forms PCT/ISA/210, PCT/ISA/237 and PCT/ISA/220), dated Oct. 27, 2016, for International Application No. PCT/EP2016/069493.

Jackson et al., "The Formation of Core Cross-linked Star Polymer and Nanogel Assemblies Facilitated by the Formation of Dynamic Covalent Imine Bonds," Polym. Chem., vol. 2, Published Aug. 30, 2011, pp. 2500-2511, XP-55243327A.

Mather et al., "Michael Addition Reactions in Macromolecular Design for Emerging Technologies," Prog. Polym. Sci., vol. 31, 2006, pp. 487-531.

McInnes et al., "Transition Metal Imide/organic Imine Metathesis Reactions: Unexpected Observations," Chem. Commun., 1998, Published Jan. 1, 1998, 1669-1670.

Meyer et al., "Zirconium-Mediated Imine Metathesis. Synthesis of 2,4-Diaza-1-zirconiacyclobutanes and the Mechanism of Their Reactions with Imines and Alkynes," J. Am. Chem. Soc., vol. 116, No. 6, 1994, pp. 2669-2670.

Taynton et al., "Heat- or Water-Driven Malleability in a Highly Recyclable Covalent Network Polymer," Advanced Materials, vol. 26, No. 23, Mar. 27, 2014, pp. 3938-3942, XP-55224390A.

Wang et al., "Metathesis Reactions of Tris(adamantylimido)methylrhenium and Aldehydes and Imines," Organometallics, vol. 18, No. 24, 1999 (Published on Web Nov. 22, 1999), pp. 5170-5175.

Zuckerman et al., "Zirconium-Mediated Metathesis of Imines: A Study of the Scope, Longevity, and Mechanism of a Complicated Catalytic System," J. Am. Chem. Soc., vol. 122, No. 5, Feb. 9, 2000 (Published on Web Jan. 25, 2000), pp. 751-761.

COMPOSITION COMPRISING A CROSS-LINKED POLYMER NETWORK, PREPARED BY RADICAL COPOLYMERISATION, COMPRISING PENDING LINKS AND CROSS-LINKS EXCHANGEABLE BY ALDEHYDE-IMINE EXCHANGE REACTIONS AND/OR BY IMINE-IMINE EXCHANGE REACTIONS, PREPARATION PROCESS AND USE

The invention relates to polymer compositions comprising cross-linked polymers comprising imine functions, and optionally aldehyde functions, enabling exchange reactions.

According to the invention, these compositions are prepared by the polymerisation of a polymer of interest precursor, a compound containing an imine and a third compound that carries an imine function or an aldehyde function. According to the invention, these compositions may also be prepared by the polymerisation of a polymer of interest precursor and a compound containing an imine and/or a compound containing an aldehyde function in the presence of a cross-linking agent including at least two pending and/or terminal imine and/or aldehyde functions. In particular, the polymer of interest precursor may be a precursor of a technical polymer or a commodity polymer, such as a thermoplastic polymer or a thermoset.

According to the invention, the imine metathesis reaction enables an exchange reaction between the substituents carried by the imines:

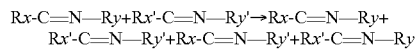

According to the invention, the imine-aldehyde exchange reaction enables an exchange reaction between the substituents carried by the imines and the aldehydes:

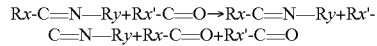

"Exchange reaction" designates that organic molecules, oligomers, polymers or polymeric networks containing imine and/or aldehyde functions can exchange their substituents by an imine metathesis reaction or by an imine-aldehyde exchange reaction. These substituents can be hydrocarbon groups, oligomer chains or polymer chains. These groups are bound to the imine and aldehyde functions by covalent bonds, before and after the exchange reaction. Preferably these groups are bound to the imine functions through a carbon atom. The imine metathesis reaction and the imine-aldehyde exchange reaction do not release a molecule of water and do not require the presence of water to take place. Notably, "exchange reaction" designates that the polymers of the invention can exchange among themselves the substituents of the imine and/or aldehyde functions that they carry by an imine metathesis reaction or by an imine-aldehyde exchange reaction. According to the invention, these functions can be pending or form part of the polymer chain, notably when they form part of a cross-link. Preferably these functions can be pending or form part of a cross-link. In this way, the polymers are capable of exchanging chemical bonds among themselves.

The metathesis reaction can be carried out in the absence of catalyst or in the presence of a new catalyst for the imine metathesis reaction that is stable, easily available, inexpensive and non-toxic.

Various transition metals, e.g. Zr (R. G. Bergman et al., J. Am. Chem. Soc., 1994, 116, 2669; R. G. Bergman et al., J. Am. Chem. Soc., 2000, 122, 751), Mo (T. Y. Meyer et al., Organometallics, 1997, 16, 5381; T. Y. Meyer et al., J. Am. Chem. Soc. 1998, 120, 8035), Ti (P. Mountford et al., Chem. Commun., 1998, 1669), Re (J. H. Espenson et al., Organometallics 1999, 18, 5170), Nb (J. W. Bruno et al., Organometallics 2000, 19, 4672) and lanthanide (Sc, Tb, Sm, La) salts (J.-M. Lehn, J. Am. Chem. Soc., 2005, 127, 5528) with triflate ions have been studied as catalysts for imine metathesis. However, as well as being generally toxic and expensive, these catalysts require several steps of synthesis to be prepared.

The development of non-toxic organic catalysts that are easily available is therefore particularly interesting.

With this in mind, the possibility of using primary amines to catalyse the metathesis of imines through transamination reactions in solution has been studied. However, the inventors have noted that the use of primary amines to catalyse imine metathesis presents many problems, in particular if these reactions are to be carried out in organic polymer materials. Due to their reactivity and nucleophilic character, the primary amines lead to numerous parasite reactions, such as amidification reactions, in polymer materials containing carboxylic acid or ester groups. The primary amines may also react with other functions of interest. In addition to the aforementioned carboxylic acid and ester functions, epoxide, isocyanate and anhydride functions and halogenated derivatives may be mentioned, without this list being exhaustive. Furthermore, the parasite reactions caused by the presence of primary amines in organic polymer materials and formulations occur increasingly as the material or the formulation is subjected to higher temperatures, as is often the case during the cross-linking process, during use and/or shaping or during recycling. Furthermore, many vinylic monomers of interest, such as acrylates, methacrylates, acrylamides and methacrylic anhydride, are not stable in the presence of primary amines because of parasite reactions such as Michael addition and amidification. As an example, the publication "Direct Synthesis of Controlled-Structure Primary Amine-Based Methacrylic Polymers by Living Radical Polymerization" (authors: Lihong He, Elizabeth S. Read, Steven P. Armes, et Dave J. Adams, Macromolecules 2007, 40, 4429-4438; doi: 10.1021/ma070670q) describes the great instability of a methacrylate monomer carrying a primary amine function and the necessity to protect the primary amine function in the form of an ammonium salt to be able to polymerise the monomer. This article also discusses the degradation reactions of methacrylic polymers carrying primary amine functions by intramolecular and intermolecular amidification reactions. The review article "Michael addition reactions in macromolecular design for emerging technologies" (authors: Mather, B. D.; Viswanathan, K.; Miller K. M.; Long, T. E.; Prog. Polym. Sci. 31 (2006) 487-531, doi:10.1016/j.progpolymsci.2006.03.001) presents examples of Michael reactions between primary amines and various vinylic compounds. In this way, the presence of pending primary amines on monomers that can be polymerised by radical polymerisation can lead to parasite reactions and limit the functional groups that can be incorporated into the materials and formulations as well as the nature of the monomers that can be used to prepare the polymers.

With this in mind, the inventors have developed cross-linked polymer compositions in which the exchange reactions can take place in the absence of catalyst, notably primary amines, or in the presence of new imine metathesis catalysts: aldehydes.

Unexpectedly, aldehyde-imine exchange reactions can also take place.

These exchange reactions enable exchangeable polymers to be obtained.

"Exchangeable polymers" designates polymers that can exchange chemical bonds, hydrocarbon groups, oligomer chains or polymer chains by imine metathesis reactions or by imine-aldehyde exchange reactions.

These exchange reactions also enable polymer compositions to be obtained that show the properties of thermoset polymers and of thermoplastic polymers and which can be insoluble and worked when hot.

By definition, a thermoset is a polymer that hardens following an input of energy, in particular on the action of heat. Thermosets are traditionally divided into two families depending on the glass-transition temperature (Tg) of their polymer matrix. Thermosets whose matrix has a Tg higher than the working temperature are called rigid thermosets, while thermosets whose matrix has a Tg lower than the working temperature are called elastomers. According to the present invention, thermoset designates both rigid thermosets and elastomers. Materials manufactured from thermoset polymers have the advantage of being able to be hardened in a way that gives them a high mechanical, thermal and chemical resistance, and for this reason they can replace metals in certain applications. They have the advantage of being lighter than metals. They can also be used as matrices in composite materials. Traditional thermosets must be manufactured; in particular they must be moulded and have the appropriate shape for their final use from the start. No transformation other than machining is possible once they are polymerised, and even machining is difficult because of their fragility. Supple and hard parts and composites based on thermoset resins cannot be transformed or shaped; nor can they be recycled. Thermoplastics belong to another class of polymeric materials. Thermoplastics can be shaped at high temperature by moulding or by injection, but have mechanical properties and thermal and chemical resistance that are less interesting than those of thermosets. In addition, the shaping of thermoplastics can often only be carried out in a very narrow temperature range. When thermoplastics are heated, they become liquids the fluidity of which varies abruptly around the melting/glass-transition temperatures, which does not allow the application of a range of transformation methods that exist for glass and for metals for example.

The new polymer compositions, including cross-linked polymers, can combine the mechanical properties and insolubility of a thermoset while being used like a thermoplastic. In this way, it is possible to develop polymer compositions that show the mechanical properties and insolubility of a thermoset but which can be transformed when hot after hardening. In particular, it is possible to develop materials that can be heated to temperatures at which they become liquid without suffering destruction or degradation of their structure. These properties notably enable the reuse of offcuts based on these polymers. In addition, for environmental reasons, the polymer composition is preferably recyclable.

Applications WO2011/151584 and WO2012/101078 describe thermosetting epoxy resins and composites that can be hot-formable and recycled. These applications describe thermoset systems based on epoxy resin that behave like thermoplastic elastomers. These compositions result from the reaction of at least one thermoset resin precursor presenting hydroxyl functions and/or epoxide groups with at least one hardener that contains carboxylic acid functional groups, in the presence of at least one transesterification catalyst, the quantity and functionality of the acid being chosen so that the resin is in the form of a network held together by ester functions and that free hydroxyl functions remain after the reaction of the precursor with the hardener. Nevertheless, epoxy resins are expensive polymers. Furthermore, applications WO2011/151584 and WO2012/101078 only describe polymers formed by stepwise polymerisation.

In the article Taynton et al., Advanced Materials, 2014, 26, 3938-3942, a cross-linked polymer network prepared from terephthaldehyde, diethylene triamine and tris(2-aminoethyl)amine is described. The authors describe malleable polyimines without catalyst that behave like a classical thermoset under ambient conditions but which may be shaped by heating or in water. However such technology can only be applied for specific polymers comprising imine functions in their main chain. The polymers described are prepared by polycondensation. Therefore the process of synthesis of these polymers occurs by elimination of water, and the polymers described cannot be prepared by radical polymerisation. Moreover, this technology requires the use of monomers carrying primary amine functions, which limits the functional groups that can be incorporated into the materials as well as the nature of the monomers that can be used to prepare the polymers.

In this way, the object of the invention is to propose polymer compositions that can combine the properties of thermosets and thermoplastics, that can be prepared from a great variety of polymer of interest precursors, including thermoplastic polymers. Polymers prepared by radical polymerisation represent about one-half by volume of the polymers produced in the world.

To do this, the inventors have conceived and developed compositions that enable polymer networks containing exchangeable cross-links and pending functions to be obtained. Preferably the polymer networks of the compositions do not contain primary amine functions.

The presence of exchangeable pending functions and exchangeable functions in the cross-links enables the macroscopic behaviour of the polymer networks formed to be easily controlled, independently of the degree of cross-linking. In this way, for a given degree of cross-linking, a given temperature and a given strain, a polymer network of the invention will relax stress quicker if it contains more exchangeable pending functions. Likewise, for a given degree of cross-linking, a given temperature and a given shear, a network of the invention will flow more rapidly if it contains more exchangeable pending functions.

The inventors have tried, without success, to prepare methacrylate and styrene polymer networks containing pending alcohol functions and cross-links containing ester functions with the aim of obtaining thermosetting systems that, while insoluble even at high temperature, can flow and are malleable. To do this, polymer networks, prepared from monomers carrying alcohol functions, such as among others 2-hydroxyethyl methacrylate or 4-vinylbenzyl alcohol, and cross-linking agents containing ester functions, such as among others ethylene glycol dimethacrylate, 1,4-butanediol dimethacrylate, 1,6-hexanediol dimethacrylate or bisphenol A dimethacrylate, have been prepared in the presence of various transesterification catalysts, such as among others zinc acetate, titanium(IV) ethoxide, titanium(IV) isopropoxide, triphenylphosphine or triazabicyclodecene. The various formulations tested did not enable polymer compositions to be prepared that show the mechanical properties of a thermoset while still being transformable at high temperature after hardening without showing degradation of their structure or that could be recycled without the notable loss of their mechanical properties.

The inventors have also tried, without success, to prepare methacrylate polymer networks containing cross-links incorporating imine functions from monomers or polymers containing pending primary amine functions with the aim of obtaining thermosetting systems that, while insoluble even at high temperature, can flow and are malleable.

To do this, methacrylate polymer networks containing cross-links incorporating imine functions have been prepared from methyl methacrylate, of monomers carrying primary amine functions, such as 2-aminoethyl methacrylate, 2-aminoethyl methacrylamide or 4-vinylbenzylamine, and cross-linking agents containing imine functions, such as the cross-linking agent D1, and/or terephthaldehyde. The various formulations tested did not enable polymer compositions to be prepared that show the mechanical properties of a thermoset while still being transformable at high temperature after hardening without showing degradation of their structure or that could be recycled without the notable loss of their mechanical properties.

Likewise, the inventors have tried, without success, to prepare methacrylate and styrene polymer networks containing pending primary or secondary ketimine functions and cross-links containing secondary ketimines with the aim of obtaining thermosetting systems that, while insoluble even at high temperature, can flow and are malleable. The various formulations tested did not enable polymer compositions to be prepared that show the mechanical properties of a thermoset while still being transformable at high temperature after hardening or that could be recycled without the notable loss of their mechanical properties.

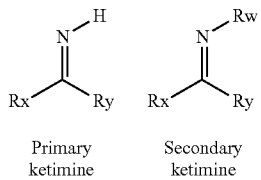

Primary ketimine     Secondary ketimine where Rx, Ry and Rw are hydrocarbon groups, identical or different, as defined below.

Unexpectedly, the inventors were able to successfully prepare polymer networks containing pending primary or secondary aldimine functions and/or aldehyde functions and cross-links incorporating secondary aldimines. In this way, the inventors have been able to successfully prepare thermosetting systems that, while insoluble even at high temperature, can flow and are malleable. It has been possible to prepare polymer compositions that show the mechanical properties and insolubility of a thermoset but that are transformable after hardening at a temperature higher than the glass transition temperature (Tg) or the melting temperature (Tf) of the polymer, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C., without suffering destruction or degradation of the structure, and that can be recycled without notable loss of their mechanical properties.

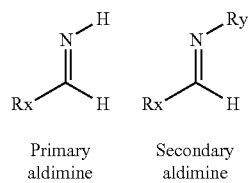

Primary aldimine     Secondary aldimine where Rx and Ry are hydrocarbon groups, identical or different, as defined below.

DESCRIPTION OF THE INVENTION

The object of the invention is a polymer composition comprising a network of cross-linked polymers. Said network is prepared by polymerisation of the following compounds:
(a) Monomers, polymer of interest precursors, said monomers carrying at least one functional group that is polymerisable by radical polymerisation;
(b) Monomers comprising at least one pending imine group and carrying at least one functional group that is polymerisable by radical polymerisation; and/or monomers comprising at least one pending aldehyde group and carrying at least one functional group that is polymerisable by radical polymerisation;
(c) Cross-linking agent comprising aldehyde and/or imine groups enabling the formation of a cross-linked polymer network containing pending functions and cross-links exchangeable by aldehyde-imine exchange reactions and/or by imine-imine exchange reactions;

The cross-linking agent is preferably a compound including at least two pending and/or terminal imine and/or aldehyde functions, chosen from among the compounds carrying:
aldehyde functions; or
imine functions linked by means of their carbon atom; or
imine functions linked by means of their nitrogen atom; or
aldehyde functions and imine functions linked by means of their carbon atom.

The monomer of interest precursors are preferably thermoplastic polymer precursors or thermosetting polymer precursors.

The polymer obtained is preferably insoluble like a thermoset but may be recycled and/or reshaped at a temperature higher than the glass-transition temperature (Tg) or the melting temperature (Tf) of the polymer, preferably higher than Tg or Tf+10° C., more preferably higher than Tg or Tf+20° C., still more preferably higher than Tg or Tf+40° C., still more preferably higher than Tg or Tf+80° C., if the glass-transition temperature or the melting temperature is lower than 25° C.

Another object of the invention is the use of aldehyde to catalyse imine-imine metathesis reactions and imine-aldehyde exchange reactions, for example those carried out in the previously defined compositions.

Another object of the invention is the materials obtained from the composition according to the invention and the formulations including a composition according to the invention.

Definitions

A group that is "polymerisable by radical polymerisation" designates any group enabling the molecule that carries it to be polymerised by radical polymerisation. As an example, monomers containing carbon-carbon unsaturated bond (for example, alkenes (vinyl)) may be mentioned. "Radical polymerisation" is polymerisation in which the growth of a polymer chain results exclusively from one or more reactions between monomer and reactive site(s) of the polymer chain, the active centre being a carbon-centred radical, with reactive site(s) being regenerated at the end of each growth step. Radical polymerisation includes initiation, propagation and termination reactions, and can also include chain-transfer reactions. "Radical polymerisation" according to the present invention designates both conventional radical polymerisation and radical polymerisation by telomerisation or any technique of controlled radical polymerisation, such as, among others, Reversible Addition-Fragmentation Chain Transfer (RAFT), Atom-Transfer Radical Polymerisation (ATRP) and Nitroxide-Mediated Polymerisation (NMP) (Moad, G.; Solomon, D. H., The Chemistry of Radical Polymerization. 2nd ed.; Elsevier Ltd: 2006; p. 639; Matyaszewski, K.; Davis, T. P. Handbook of Radical Polymerization; Wiley-Interscience: Hoboken, 2002; p. 936).

A "hydrocarbon" group according to the present invention is a group consisting of atoms of carbon and hydrogen. This group may also include heteroatoms and/or be substituted by halogens. The hydrocarbon group preferably includes 1-50, more preferably 1-18, still more preferably 1-12 carbon atoms.

"Heteroatom" according to present invention designates atoms of sulfur, nitrogen, oxygen, boron, phosphorus or silicon.

"Halogen" according to present invention designates atoms of fluorine, chlorine, bromine or iodine.

Hydrocarbon groups may be aliphatic or aromatic.

"Aliphatic" according to the present invention designates an "alkyl", "alkenyl", "alkanediyl", "alkenediyl" or "cycloalkyl" group. The valence of the group will be determined case-by-case.

An aliphatic group may include heteroatoms. In particular, it may include ester, amide, ether, thioether, secondary or tertiary amine, carbonate, urethane, carbamide or anhydride functions. If applicable, the aliphatic group may be substituted notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions.

An "alkyl" group according to the present invention designates a saturated or unsaturated, linear or branched hydrocarbon chain, preferably comprising 1-50 carbon atoms, more preferably 1-18 carbon atoms, still more preferably 1-12 carbon atoms, and which can include one or more heteroatoms. In this way, according to the invention, ignoring the strict sense of the term, "alkyl" also includes:

"alkenyls", that is hydrocarbon chains comprising at least one double bond;

"heteroalkyls", that is alkyl groups as defined above comprising at least one heteroatom.

An "alkanediyl" group according to the present invention designates a divalent, saturated or unsaturated, linear or branched hydrocarbon chain, preferably comprising 1-50 carbon atoms, more preferably 1-18 carbon atoms, still more preferably 1-12 carbon atoms, and which can include one or more heteroatoms. In this way, according to the invention, ignoring the strict sense of the term, "alkanediyl" also includes "alkenediyls", that is hydrocarbon chains comprising at least one double bond, for example a vinylene (ethenylene) group or a propenylene group, and "heteroalkanediyls", that is alkanediyl groups as defined above comprising at least one heteroatom.

"Terpenoid" according to the present invention designates any group comprising a skeleton close to a terpene. "Terpene" designates an isoprene derivative that is obtained by connection of $C_5H_8$ units, leading for example to monoterpenes and sesquiterpenes. "Close" designates that the skeleton is similar to a terpene or different in that at least one alkyl substituent that is normally present may be absent or carried by another atom. Furthermore, the skeleton may be substituted by various radicals such as aliphatic or oxy radicals, aldehydes, esters, alcohols, ethers and their sulfur and nitrogen equivalents. This "terpenoid" group will be monovalent or divalent, case by case.

A "cycloalkyl" group according to the present invention designates a cyclical alkyl chain, which may be saturated or partially unsaturated but not aromatic, preferably comprising 3-10 carbon atoms in the ring. The alkyl chain may include one or more heteroatoms; in this case it will be specifically called "heterocycloalkyl". The group may comprise more than one ring, and in this way includes fused, linked or spiro rings. Examples include cyclopropyl, cyclopentyl, cyclohexyl, cycloheptyl, pyrrolidinyl, piperidinyl, piperazinyl or morpholinyl groups. If applicable, the cycloalkyl group may be substituted notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions. If applicable, the cycloalkyl group maybe divalent; in this case it is preferably called a "cycloaliphatic" radical.

"Aromatic" according to the present invention designates a monovalent or multivendor group comprising an aromatic hydrocarbon group. The valence of the group will be determined case-by-case.

The aromatic group may include heteroatoms; in this case it is called a "heteroaromatic" radical. In particular, it may include ester, amide, ether, thioether, secondary or tertiary amine, carbonate, urethane, carbamide or anhydride functions. An aromatic group may comprise one or more rings that are fused or covalently linked. If applicable, the aromatic group may be substituted notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions.

The term "aromatic" includes "arylaromatic" groups, that is a group comprising at least one aromatic group and at least one aliphatic group, as defined. The aliphatic group may be linked to one part of the molecule and the aromatic group to another part of the molecule. The group may comprise two aromatic groups, each linked to a part of the molecule and linked between them by an aliphatic chain.

"Aryl" according to the present invention designates an aromatic hydrocarbon group. The term "aryl" includes aralkyl and alkyl-aryl groups. The aromatic hydrocarbon group may be substituted once or several times, notably by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz or —N(H)—C(O)-Rz group with Rz, R'z, identical or different, representing a $C_1$-$C_{50}$ alkyl radical, or by a functional group chosen from among the functional groups that are polymerisable by radical polymerisation and the and the aldehyde and/or imine functions.

"Alkyl-aryl" according to the present invention designates an alkyl group, as defined above, linked to the rest of the molecule through an aromatic group, as defined above.

"Aralkyl" according to the present invention designates an aryl group, as defined above, linked to the rest of the molecule through an aliphatic group, as defined above.

"Heteroaryl" according to the present invention designates an aryl group in which at least one of the atoms of the aromatic ring is a heteroatom. "Heteroalkyl-aryl" according to the present invention designates an alkyl-aryl group, as defined, substituted by at least one heteroatom. "Heteroaralkyl" according to the present invention designates an aralkyl group, as defined, substituted by at least one heteroatom.

The term "imine" according to the present invention designates a group comprising the function C=N. According to the invention, the imine is a primary or secondary aldimine:

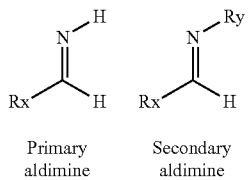

Primary aldimine    Secondary aldimine where Rx and Ry are different from H and may be identical or different. Rx and Ry are hydrocarbon radicals as defined above. Preferably, the imine is a secondary aldimine. Preferably, the radicals Rx and Ry and bound to the imine function by a covalent bond through a carbon atom.

The imine and aldehyde groups of the invention have the following structures:

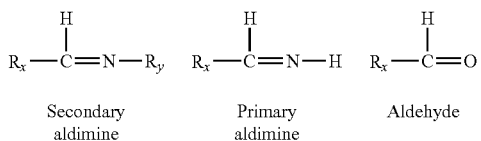

Secondary aldimine    Primary aldimine    Aldehyde where Rx and Ry are hydrocarbon groups. Preferably, the radicals Rx and Ry and bound to the imine function by a covalent bond through a carbon atom.

In particular, independently for each group, Rx represents an alkyl, aryl, aralkyl, alkyl-aryl or cycloalkyl radical. This radical can contain heteroatoms, in particular chosen from among O, N, S or Si, and/or may be substituted. Rx is preferably and aryl, heteroaryl or terpenoid group.

In particular, this radical Rx may be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. In particular, this radical Rx may include ester, amide, ether, thioether, secondary or tertiary amine, carbonate, urethane, carbamide or anhydride functions.

In particular, independently for each group, Ry represents an alkyl, aryl, aralkyl, alkyl-aryl or cycloalkyl radical. This radical can contain heteroatoms, in particular chosen from among O, N, S or Si, and/or may be substituted. In particular, this radical Ry may be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a $C_1$-$C_{50}$ alkyl radical. In particular, this radical Ry may include ester, amide, ether, thioether, secondary or tertiary amine, carbonate, urethane, carbamide or anhydride functions.

These imine and aldehyde groups are preferably linked, through Rx and/or Ry, to a polymer chain or to a functional group that is polymerisable by radical polymerisation.

A polymer comprises a set of polymer chains of different molecular dimensions, notably of different molar masses. A polymer chain according to this invention is a chain of atoms linked only by C—C, C=C, C—X or C=X covalent bonds, where X is a chemical element other than carbon, preferably with the exception of the C=N double bond in the main chain. The polymer chains are made up from the covalent assembly of a large number of repetitive units called monomer units.

The polymer chains so defined have molecular dimensions (characterised by their molar mass) very much larger than those of simple molecules, and are made up from the covalent assembly of more than ten monomer units, preferably of more than 50 monomer units, still more preferably of more than 100 monomer units.

Polymer chains comprising a single type of monomer unit are called homopolymers. Polymer chains comprising several types of monomer unit are called copolymers. According to this invention, polymer and polymer chain designate both homopolymers and copolymers.

The monomer units constituting the polymer chain may be linked to a variable number of other monomer units. The number of other monomer units to which a monomer unit is linked is called valence. A monomer unit that is linked to a single other monomer unit has a valence of 1 and corresponds to an extremity of the polymer chain. A monomer unit that is linked to two other monomer units has a valence of 2 and corresponds to a linear sequence of a polymer chain. A monomer unit that is linked to more than two other monomer units has a valence greater than 2 and corresponds to a branching point.

A function is pending if it is linked by a covalent bond by one and only one of its hydrocarbon substituents (Rx or Ry) to a monomer unit with a valence greater than 1. In other words, a function is pending if it is linked by a covalent bond to a polymer chain by one and only one of its hydrocarbon substituents Rx or Ry and if it does not constitute an extremity of the polymer chain. A function is terminal, or constitutes a chain extremity, if it is linked by a covalent bond by one and only one of its hydrocarbon substituents (Rx or Ry) to a monomer unit with a valence equal to 1.

An imine function forms part of a cross-link if it is linked by its hydrocarbon substituent Rx through a covalent bond to a monomer unit covalently connected to at least two other monomer units not comprising the said imine function, and if it is linked by its hydrocarbon substituent Ry through a covalent bond to a monomer unit covalently connected to at least two other monomer units not comprising the said imine function.

In this way, the term "pending group" according to the present invention designates a side-group of the polymer chain. "Side-group" according to the present invention designates a substituent that is not an oligomer or a polymer. A side-group is not integrated into the main chain of the polymer. The term "pending imine group" according to the present invention designates a side-group comprising a primary aldimine or secondary aldimine function. In the presence of a secondary aldimine, Rx-C=NH-Ry, one of the two substituents is not linked to a polymer chain unless it is through an imine function. The imine may be linked to the side group by its carbon atom or its nitrogen atom. The term "pending aldehyde group" according to the present invention designates a side-group comprising an aldehyde.

When the term "pending group" is used to qualify a monomer, it designates that when the monomer is polymerised the group is pending and not integrated into the main chain that is forming.

According to this invention, a compound is said to be "free" if it is not linked by a covalent bond to a polymer of the composition.

According to this invention, a "free monofunctional aldehyde" is a free molecule containing one and only one aldehyde function. A "free monofunctional aldehyde" may or may not contain one or more other functions insofar as these are not imine, aldehyde or primary amine functions.

According to this invention, a "free monofunctional imine" is a free molecule containing one and only one imine function. A "free monofunctional imine" may or may not contain one or more other functions insofar as these are not imine, aldehyde or primary amine functions.

"Network of cross-linked polymers" according to the present invention designates a material composed of polymer and/or oligomer chains linked to each other by covalent bonds that, when immersed in a good non-reactive solvents for the polymer and/or oligomer chains that constituted at a mass fraction of 1/10, shows an insoluble mass fraction greater than 0.1%, preferably greater than 0.5%, 1%, 2%, 5%, 10%, 20%, 30%, 40%, 50% and 70%, after 48 hours of immersion at atmospheric pressure and at a temperature between the melting temperature and the boiling temperature of the solvent. A good non-reactive solvent is a good solvent that will not degrade the polymer chains or the imine or aldehyde functions and that will not participate in imine-imine or aldehyde-imine exchange reactions. The insolubility can be assessed by the naked eye by passing the formulation through a filter with a porosity of 0.2 micrometres, preferably of 0.4 micrometres, still more preferably of 1 micrometre.

A solvent is defined as a molecule, or a mixture of molecules, that is liquid at room temperature, that is not a polymer and that has the property, at room temperature, of dissolving and/or diluting other substances without modifying them chemically and without being modified itself. Among solvents, a distinction is made between good solvents, which present the property of dissolving substances at room temperature without modifying them chemically without being modified itself, and poor solvents, which present the property of diluting substances at room temperature without dissolving then, modifying them chemically and without being modified itself.

A solvent can therefore be a good solvent for one compound and a poor solvent for another compound.

The glass transition temperature, Tg, is defined as the temperature at which the value of the damping factor, or loss factor, tan δ is at a maximum by dynamic mechanical analysis at 1 Hz. The damping factor, or loss factor, tan δ, is defined as the ratio of the loss modulus E" to the conservation modulus E' (Mechanical Properties of Solid Polymers, Author(s): I. M. Ward, J. Sweeney; Editor: Wiley-Blackwell; Edition: 3rd Edition; Print ISBN: 9781444319507; DOI: 10.1002/9781119967125).

DETAILED DESCRIPTION

Throughout the description, the term "exchangeable links" implies links that are exchangeable by aldehyde-imine exchange reactions or by imine-imine exchange reactions. These links may be present in the pending links or in cross-links.

The object of the invention is a polymer composition comprising a network of cross-linked polymers. Said network is prepared by copolymerisation of the following compounds:
  (a) Monomers, polymer of interest precursors, said monomers carrying at least one functional group that is polymerisable by radical polymerisation;
  (b) Monomers comprising at least one pending imine group and carrying at least one functional group that is polymerisable by radical polymerisation; and/or monomers comprising at least one pending aldehyde group and carrying at least one functional group that is polymerisable by radical polymerisation;
  (c) Cross-linking agent comprising aldehyde and/or imine groups enabling the formation of a cross-linked polymer network containing pending functions and cross-links exchangeable by aldehyde-imine exchange reactions and/or by imine-imine exchange reactions.

The cross-linked polymer network of the invention is preferably prepared from a mixture of monomers that are polymerisable by radical polymerisation containing a mole fraction of monomer(s) containing a primary amine function of less than 40%, still more preferably a mole fraction of monomer(s) containing a primary amine function of less than 30%, still more preferably a mole fraction of monomer(s) containing a primary amine function of less than 20%, still more preferably a mole fraction of monomer(s) containing a primary amine function of less than 10%, still more preferably a mole fraction of monomer(s) containing a primary amine function of less than 5%, still more preferably a mole fraction of monomer(s) containing a primary amine function of less than 2.5%, still more preferably a mole fraction of monomer(s) containing a primary amine function of less than 1%. The fractions are expressed with respect to the total number of moles of monomers that are polymerisable by radical polymerisation.

A first usable cross-linking agent is a compound comprising at least two imine and/or aldehyde functions. This first cross-linking agent is called a "bi- or multifunctional cross-linking agent". This compound may comprise only imine functions, all linked to the rest of the molecule by the carbon atom of the imine bond; or only imine functions, all linked to the rest of the molecule by the nitrogen atom of the imine bond; or only aldehyde functions. It may also comprise both aldehyde functions and imine functions, all linked to the rest of the molecule by the carbon atom of the imine bond.

To enable the formation of a cross-linked polymer network with exchangeable pending links and cross-links, a cross-linking agent that will not, on its own, react with itself and lose its functionality, is preferably used. In this way, the cross-linking agent carries the following pending and/or terminal functions:

aldehyde functions; or
pending and/or terminal imine functions linked to the agent by their carbon atom; or
pending and/or terminal imine functions linked to the agent by their nitrogen atom; or
aldehyde functions and pending and/or terminal imine functions linked to the agent by their carbon atom.

The cross-linking agent may be a molecule or a polymer.

In a preferred variant, the carbon atom of the imine functions and the carbon atom of the aldehyde functions of the monomers comprising at least one pending imine group, of the monomers comprising at least one aldehyde group and of the cross-linking agent are directly linked to an aryl or heteroaryl group or to the alkene function of a terpenoid group.

In a first embodiment of this first variant, the cross-linking agent is a molecule.

This molecule may or may not comprise a functional group that is polymerisable by radical polymerisation.

The cross-linking agent is preferably a compound of formula (I) below:

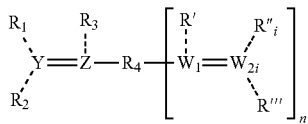

in which
n is a whole number between 1 and 6;
i is a whole number between 1 and n;
the dashed bond is present or absent, depending on the valence of Y, Z, $W_1$ and $W_2$;
Y and Z are different, and each represents either C or N; or Y is O and Z is C;
  when Y represents C, Z represents N and $R_1$ represents a hydrocarbon group, $R_2$ represents H and $R_3$ is absent;
  when Y represents N, Z represents C and $R_1$ represents H or a hydrocarbon group, $R_2$ is absent and $R_3$ represents H;
  when Y represents O, Z represents C and $R_1$ and $R_2$ are absent and $R_3$ represents H;
$R_4$ represents a hydrocarbon group. Preferably, $R_4$ is linked to the imine and/or aldehyde functions through a carbon atom
in each block $W_1(R')=W_{2i}(R''_i)(R''')$,
  $W_1$ and $W_2$ are different, and each represents either C or N; or $W_{2i}$ is O and $W_1$ is C;
    when $W_{2i}$ represents C, $W_1$ represents N and R' is absent, $R''_i$ represents a hydrocarbon group and R''' represents H;
    when $W_{2i}$ represents N, $W_1$ represents C and R' represents H, $R''_i$ represents H or a hydrocarbon group and R''' is absent;
    when $W_{2i}$ represents O, $W_1$ represents C and $R''_i$ and R''' are absent and R' represents H;
  when Z represents C, $W_1$ represents C;
  when Y represents C, $W_{2i}$ represents C.

$R_4$ may in particular represent a ring hence enabling the presence of several $[W_1(R')=W_{2i}(R''_i)(R')]$ blocks, possibly on each carbon atom or heteroatom of the ring.

The $[W_1(R')=W_{2i}(R''_i)(R''')]$ block is present n times, depending on the number of substitutions possible on the radical $R_4$. Compound (I) may therefore be a compound known as a "star compound".

n is a whole number between 1 and 6, preferably between 1 and 4.

i is a whole number between 1 and n.

From one block to another (and likewise for different values of i), the definition of $W_{2i}$ or $R''_i$ may vary, which means that the blocks are not necessarily identical to each other. On the contrary, the definition of $W_1$ may not vary from one block to another, being either always C or always N. Likewise, the definition of R' may not vary from one block to another, being either always H or always absent. Likewise, the definition of R''' may not vary from one block to another, being either always H or always absent.

$R_4$ may be linked to the carbon atom or to the nitrogen atom of the imine and/or aldehyde functions. $R_4$ is preferably linked to the imine and/or aldehyde functions through a carbon atom. $R_4$ is preferably an aliphatic, aromatic, arylaliphatic or cycloaliphatic group that may also comprise heteroatoms such as O, N, S, or Si. In a preferred embodiment, $R_4$ represents an aromatic or heteroaromatic group. Preferably, $R_4$ represents a $C_1$-$C_{12}$ alkanediyl group, a benzene ring, a naphthalene ring, an arylaliphatic group comprising two benzene rings linked by a $C_1$-$C_6$ alkanediyl group, a pyrimidine ring or a triazine ring.

Preferably, when Y represents O, Z represents C, $W_1$ represents C, $W_{2i}$ represents O, $R_1$, $R_2$, $R''_i$ and R''' are absent and $R_3$ and R' represent H.

Preferably, when Y represents N or O, Z represents C, $W_1$ represents C, $W_{2i}$ represents N or O, $R_2$, $R_2$, $R''_i$ and R''' are absent, $R_3$ and R' represent H, and, depending on the valence of Y, $W_{2i}$, $R_1$ and $R''_i$ represent a hydrocarbon group or are absent when Y and $W_2$, represent O.

Preferably, when Y represents C, Z represents N, $W_1$ represents N, $W_{2i}$ represents C, $R_3$ and R' are absent, $R_2$ and R''' represent H, and $R_1$ and $R''_i$ represent a hydrocarbon group.

When it is present, $R_1$ preferably represents a hydrogen atom or an alkyl, alkenyl, aryl, cycloalkyl, heteroaryl, heteroalkyl or heterocycloalkyl group, and each of these groups may be substituted. $R_2$ represents H or is absent. $R_3$ represents H or is absent. Preferably, $R_1$ represents an alkyl, alkenyl, aryl, heteroaryl, alkyl-aryl, heteroalkyl-aryl, aralkyl, heteroaralkyl, cycloalkyl or heterocycloalkyl group; each of these groups may be substituted.

When it is present, $R''_i$ preferably represents a hydrogen atom or an alkyl, alkenyl, aryl, cycloalkyl, heteroaryl, heteroalkyl or heterocycloalkyl group, and each of these groups may be substituted. R' represents H or is absent. R''' represents H or is absent. Preferably, $R''_i$ represents an alkyl, alkenyl, aryl, heteroaryl, alkyl-aryl, heteroalkyl-aryl, aralkyl, heteroaralkyl, cycloalkyl or heterocycloalkyl group; each of these groups may be substituted.

In a particular embodiment, one of $R_1$, $R_4$, and R' carries a functional group that is polymerisable by radical polymerisation.

Preferably, when none of the radicals $R_1$, $R_4$, or $R''_i$ in formula (I) carries a polymerisable functional group, then:

When the imine function is linked by its carbon atom to the functional group that is polymerisable by radical polymerisation in the monomer comprising at least one pending imine group, Z and $W_1$ represent N in the compound of formula (I);

When the imine function is linked by its nitrogen atom to the functional group that is polymerisable by radical polymerisation in the monomer comprising at least one pending imine group, Z and $W_1$ represent C in the compound of formula (I);

When the monomer comprising at least one pending aldehyde group is used in the absence of the monomer comprising at least one pending imine group, Z and $W_1$ represent N in the compound of formula (I);

When the compound of formula (I) is a polyaldehyde, the monomer comprising at least one pending imine group is present and the imine function in this compound is linked by its nitrogen atom to the functional group that is polymerisable by radical polymerisation.

In another specific embodiment, one of $R_1$, $R_4$, and R'" carries at least one functional group that is polymerisable by radical polymerisation, in particular a vinyl group.

The cross-linking agent is preferably a monomer that comprises at least one pending imine group and carries at least one functional group that is polymerisable by radical polymerisation, and the imine function is linked to the polymerisable group by the nitrogen atom.

The compound of formula (I) is preferably:
The product of the reaction of a polyamine and an aldehyde;
The product of the reaction of a polyaldehyde and an amine;
a polyaldehyde;
a polyimine.

The polyamine is in particular an alkylpolyamine, more particularly a $C_1$-$C_{12}$ alkylpolyamine. The polyamine may be a diamine, a triamine, a tetramine, a pentamine or a hexamine. In particular, ethylene diamine, propylene diamine, tetramethylene diamine, 1,6-hexamethylenediamine and tris(2-aminoethyl)amine may be mentioned.

The polyamine may also be an aromatic polyamine; the aromatic ring may in particular be benzene, pyridine, pyrimidine or triazine. In particular, phenylenediamine, phenylenetriamine, diaminopyrimidine, triaminopyrimidine, tetraaminopyrimidine, diaminotriazine and triaminotriazine.

The polyaldehyde may be a dialdehyde, a trialdehyde, a tetraaldehyde, a pentaaldehyde or a hexaaldehyde. The polyaldehyde is preferably an aromatic or arylaliphatic polyaldehyde, composed of two benzene rings linked by an alkanediyl group. In particular, terephthaldehyde, isophthaldehyde, trimesaldehyde and pyridinedicarboxaldehyde may be mentioned. The arylaliphatic polyaldehyde may be obtained for example by coupling of 4-carboxybenzaldehyde with pentaerythritol, by coupling of 4-carboxybenzaldehyde with erythritol, by coupling of 4-carboxybenzaldehyde with dipentaerythritol, by coupling of 4-carboxybenzaldehyde with tris(hydroxymethyl)methane. The aldehyde or the amine may in addition be functionalised by a functional group that is polymerisable by radical polymerisation, in particular a vinyl group.

In a second embodiment of the first variant, the cross-linking agent is a polymer.

In this second embodiment, the polymer includes pending aldehyde and/or imine functional groups. The polymer carries:

aldehyde functional groups; or
pending imine functional groups linked to the polymer by the carbon atom; or
pending imine functional groups linked to the polymer by the nitrogen atom; or
aldehyde functional groups and pending imine functional groups linked to the polymer by the carbon atom.

The polymeric chain may be any polymer that may be functionalised with pending aldehyde and/or imine groups.

The use of a polymer as cross-linking agent enables the viscosity of the composition of monomers to be polymerised to be modulated.

The polymer carrying pending aldehyde groups may be obtained by radical copolymerisation of one or several monomers that are precursors of thermoplastic polymers with one or several monomers that are polymerisable by radical polymerisation comprising at least one pending aldehyde group.

The polymer carrying pending imine groups may be obtained by radical copolymerisation of one or several monomers that are precursors of thermoplastic polymers with one or several monomers that are polymerisable by radical polymerisation comprising at least one pending imine group.

In a preferred variant of the invention, the carbon atom of the imine functions and the carbon atom of the aldehyde functions of the monomers comprising at least one pending imine group, of the monomers comprising at least one aldehyde group and of the cross-linking agent are directly linked to an aryl or heteroaryl group or to the alkene function of a terpenoid group.

In a second variant or in addition to the cross-linking agent of the first variant, the cross-linking agent is a monomer that is an imine functional compound, comprising at least one pending imine function per monomer and carrying at least one group that is polymerisable by radical polymerisation, the imine function being linked to the polymerisable group by its nitrogen atom.

In particular, when the polymerisation is carried out in the presence of monomers comprising at least one pending imine group, in which the imine function is linked to the polymerisable group by its carbon atom, and of monomers comprising at least one pending imine group, in which the imine function is linked to the polymerisable group by its nitrogen atom, a cross-linked polymer presenting the desired thermosetting/thermoplastic properties may be obtained. Specifically, the polymer network will contain pending imine functional groups, of small size (i.e. that do not form part of the main chain of the polymer), available for exchange reactions. In such a case, the presence of a bi- or multifunctional cross-linking agent of the first variant is optional.

In a preferred variant, the carbon atom of the imine functions of the monomers comprising at least one pending imine group, and the carbon atom of the aldehyde functions of the monomers comprising at least one aldehyde group are directly linked to an aryl or heteroaryl group or to the alkene function of a terpenoid group.

The cross-linked polymer is obtained by radical polymerisation
of at least one monomer precursor of a polymer of interest and of at least one monomer comprising at least one pending imine group;
of at least one monomer precursor of a polymer of interest and of at least one monomer comprising at least one pending aldehyde group;
of at least one monomer precursor of a polymer of interest, of at least one monomer comprising at least one pending imine group and of at least one monomer comprising at least one pending aldehyde group;
in the presence of at least one of the cross-linking agent described above.

In a preferred variant, the carbon atom of the imine functions and the carbon atom of the aldehyde functions of the monomers comprising at least one pending imine group, of the monomers comprising at least one aldehyde group and of the cross-linking agent are directly linked to an aryl or heteroaryl group or to the alkene function of a terpenoid group.

The polymer of the invention may be prepared by radical polymerisation:
of monomers that are precursors of polymers of interest, of monomers comprising at least one pending imine group in the presence of a bi- or multifunctional cross-linking agent as defined previously, in particular a compound of formula (I);
of monomers that are precursors of polymers of interest, of monomers comprising at least one pending aldehyde group in the presence of a bi- or multifunctional cross-linking agent as defined previously, in particular a compound of formula (I).

Preferably, in either of the cases, the polymerisation is in addition carried out in the presence of monomers comprising at least one pending aldehyde or imine group respectively. The polymerisation may also be carried out in the presence of monomers that comprise at least one pending imine group and carry at least one functional group that is polymerisable by radical polymerisation, and the imine function is linked to the polymerisable group by the nitrogen atom.

As specific examples, the following may be listed:
the polymers obtained by copolymerisation of at least one monomer precursor to a polymer of interest, of at least one monomer comprising at least one pending imine group and a bi- or multifunctional cross-linking agent as defined previously, provided that
when the imine function in the monomer comprising at least one pending imine group is linked to the functional group that is polymerisable by radical polymerisation by its carbon atom, the cross-linking agent: (1) if it is a polymer, the pending groups comprise an imine function linked to the polymer by its nitrogen atom; (2) if it is a compound of formula (I), Z and $W_1$ represent N and
when the bi- or multifunctional cross-linking agent, of formula (I), is a polyaldehyde, the imine function in the compound comprising at least one pending imine group is linked to the functional group that is polymerisable by radical polymerisation by its nitrogen atom;
the polymers obtained by copolymerisation of at least one monomer precursor to a polymer of interest, of at least one monomer comprising at least one pending aldehyde group and a compound of formula (I) comprising at least two imine functional groups;
the polymers obtained by copolymerisation of at least one monomer precursor to a polymer of interest, of at least one monomer comprising at least one pending imine group and a compound of formula (I) comprising a functional group that is polymerisable by radical polymerisation;
the polymers obtained by copolymerisation of at least one monomer precursor to a polymer of interest, of at least one monomer comprising at least one pending aldehyde group and a compound of formula (I) comprising a functional group that is polymerisable by radical polymerisation.

Preferably, the polymer is obtained by copolymerisation:
of monomers that are precursors to polymers of interest, of monomers comprising at least one pending imine group in which the imine function is linked to the polymerisable group by the carbon atom, and of the cross-linking agent comprising a monomer comprising an imine group linked to the polymerisable group by the nitrogen atom; or
of monomers that are precursors to polymers of interest and of monomers comprising at least one pending imine group in which the imine function is linked to the polymerisable group by the carbon atom, in the presence of a cross-linking agent without a polymerisable group; or
of monomers that are precursors to polymers of interest, of monomers comprising at least one pending imine group in which the imine function is linked to the polymerisable group by the carbon atom, of monomers comprising at least one pending aldehyde group, and of the cross-linking agent comprising a monomer comprising an imine group linked to the polymerisable group by the nitrogen atom; or
of monomers that are precursors to polymers of interest and of monomers comprising at least one imine group in which the imine function is linked to the polymerisable group by the carbon atom, and of monomers comprising at least one pending aldehyde group, in the presence of a cross-linking agent without a polymerisable group; or
of monomers that are precursors to polymers of interest, of monomers comprising at least one aldehyde group, and of the cross-linking agent comprising a monomer comprising an imine group linked to the polymerisable group by the nitrogen atom; or
of monomers that are precursors to polymers of interest, of monomers comprising at least one aldehyde group, in the presence of a cross-linking agent without a polymerisable group.

When the polymerisation is carried out in the presence of monomers comprising at least one pending aldehyde group and of monomers comprising at least one pending imine group, in which the imine function is linked to the polymerisable group by the nitrogen atom, a cross-linked polymer presenting the desired thermosetting/thermoplastic properties may be obtained. The polymer network will contain pending aldehyde and/or imine functional groups, of small size (i.e. that do not form part of the main chain of the polymer), available for exchange reactions. In such a case, the presence of the compound of formula (I) is optional.

In the invention, the polymerisable functional group is preferably a —C=C— double bond, in particular of formula *—C=CH$_2$ (vinyl group) where * is the rest of the monomer precursor to a polymer of interest, the rest of the monomer comprising at least one pending imine group, the rest of a cross-linking agent comprising a polymerisable group or the rest of monomers comprising at least an aldehyde group or the rest of the cross-linking agent of formula (I), as applicable.

The monomer precursors of polymers of interest are preferably thermoplastic polymer precursors or thermosetting polymer precursors.

By the process according to the invention, polymer preparations having the properties of thermosets and thermoplastics may be prepared from any thermoplastic polymer precursor that is polymerisable by radical polymerisation.

For example, the polymer of interest precursor is chosen from the group including styrene and its derivatives, alkyl methacrylates, arylalkyl methacrylates, alkyl acrylates, arylalkyl acrylates, acrylonitrile, acrylamides, methacrylamides, ethylene, fluoroalkyl methacrylates, fluoroalkyl acrylates, halogenated alkenes (tetrafluoroethylene, chlorotrifluoroethylene), alkyl dienes (butadiene, isoprene), vinyl acetate, vinyl chloride, vinylidene fluoride, maleic anhydride, maleimides, N-vinylpyrrolidone, 2-vinylpyridine, 4-vinylpyridine, N-vinylcarbazole and appropriate mixtures. "Appropriate mixtures" designates precursors that are compatible to be copolymerised. This may easily be determined by the person skilled in the art on the basis of his/her general knowledge.

These monomers are commercially available.

In a preferred embodiment, the polymer precursor is an alkyl (meth)acrylate, in particular methyl (meth)acrylate.

In another preferred embodiment, the polymer precursor is styrene.

It is perfectly conceivable to use several different monomers precursor of polymers of interest.

The person skilled in the art knows how to choose compatible monomers.

The monomer comprising at least one pending imine group may be any compound comprising an imine function and a functional group that is polymerisable by radical polymerisation. The imine function may be linked to the substituent carrying the polymerisable functional group by its carbon atom C or by its nitrogen atom N.

The monomer preferably has the formula IIa (imine linked to the polymerisable group by its carbon atom) or IIb (imine linked to the polymerisable group by its nitrogen atom) below:

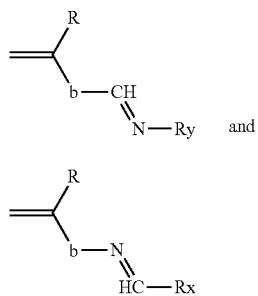

where
R represents H, CH$_3$, or CH$_2$—CH$_3$
b represents a hydrocarbon radical.

In particular, b represents an aliphatic, terpenoid, aromatic, arylaliphatic or cycloaliphatic radical. This radical can contain heteroatoms, in particular chosen from among O, N, S or Si, and/or may be substituted. In particular, this radical may be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a C$_1$-C$_{50}$ alkyl radical. In particular, this radical may include ester, amide, ether, thioether, secondary or tertiary amine, carbonate, urethane, carbamide or anhydride functions.

Rx and Ry each represents a hydrocarbon radical, such as alkyl, alkenyl, cycloalkyl, heteroalkyl, terpenoid, aryl, heteroaryl, alkyl-aryl or aralkyl. In particular, Ry represents an alkyl, alkenyl, cycloalkyl or heteroalkyl radical. In particular, Rx represents an aryl, heteroaryl or terpenoid radical.

In formula IIa, b is preferably an aryl, a heteroaryl or a terpenoid.

The monomer is preferably the product of the reaction between an amine and an aldehyde. This reaction is carried out according to methods known to the person skilled in the art. One of these two reagents carries a functional group that is polymerisable by radical polymerisation. These initial reagents are commercially available or may be synthesised according to methods known to the person skilled in the art.

The polymerisable functional group is preferably a vinyl group.

In particular, the monomer is chosen from the group comprising styrene derivatives, alkyl methacrylates, alkyl acrylates, arylalkyl methacrylates, arylalkyl acrylates, acrylamides, methacrylamides, alkenes, halogenated alkenes, vinyl acetate derivatives, maleimides, and vinylpyridine derivatives.

The monomer comprising at least one pending aldehyde group may be any compound comprising an aldehyde function and a functional group that is polymerisable by radical polymerisation. This group is preferably a vinyl group.

The monomer preferably has the formula III below:

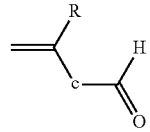

where
R represents H, CH$_3$, or CH$_2$—CH$_3$
c represents a hydrocarbon radical.

In particular, c represents an aliphatic, aromatic, arylaliphatic or cycloaliphatic radical, preferably an aromatic, heteroaromatic or terpenoid radical. This radical can contain heteroatoms, in particular chosen from among O, N, S or Si, and/or may be substituted. In particular, this radical may be substituted by functional groups such as ester or amide functions. In particular, this radical is substituted by a halogen, an -Rz, —OH, —NHRz, —NRzR'z, —C(O)—OH, —C(O)—NRzR'z, —C(O)—O-Rz, —O—C(O)-Rz, —O—C(O)—O-Rz, —O—C(O)—N(H)-Rz, —N(H)—C(O)—O-Rz, —O-Rz, —S-Rz, —C(O)—N(H)-Rz, —N(H)—C(O)-Rz group with Rz, R'z, identical or different, representing a C$_1$-C$_{50}$ alkyl radical. In particular, this radical may include ester, amide, ether, thioether, secondary or tertiary amine, carbonate, urethane, carbamide or anhydride functions.

In particular, the monomer is chosen from the group comprising styrene derivatives, alkyl methacrylates, alkyl acrylates, arylalkyl methacrylates, arylalkyl acrylates, acrylamides, methacrylamides, alkenes, halogenated alkenes, vinyl acetate derivatives, maleimides, and vinylpyridine derivatives.

This monomer could be prepared for example by coupling of a reagent carrying a functional group that is polymerisable by radical polymerisation and a halogen with another reagent carrying an aldehyde and an alcohol, according to methods known to the person skilled in the art. This monomer could also be prepared for example by coupling of a reagent carrying a functional group that is polymerisable by radical polymerisation and a anhydride function with another reagent carrying an aldehyde and an alcohol, according to methods known to the person skilled in the art. This monomer could also be prepared for example by coupling of a reagent carrying a functional group that is polymerisable by radical polymerisation and a carboxylic acid or acyl halide function with another reagent carrying an aldehyde and an alcohol, according to methods known to the person skilled in the art. These initial reagents are commercially available or may be synthesised according to methods known to the person skilled in the art.

The polymers according to the invention include pending imine and/or aldehyde functions. The polymers of the invention also include imine functions in their side-chains forming cross-links. This enables an exchange between imines and improves the cross-linking of the polymers. The inventors think that the exchange reactions between imines enables a circulation of cross-links and could explain the thermoplastic behaviour when the composition, in itself, is insoluble like a thermoset.

Unexpectedly, the inventors have discovered that exchange reactions between imines can be catalysed by an aldehyde, which can be present in the polymer (pending aldehyde group) or as a non-polymerisable molecule, said to be "free".

Preferably, the aldehyde used to catalyse the imine metathesis is an aromatic aldehyde, that is a molecule in which the aldehyde function is carried by an aryl or heteroaryl group, preferably a benzene ring. Notably, benzaldehyde and its derivatives can be mentioned. Preferably, the aldehyde used to catalyse the imine metathesis is an aldehyde in which the carbon of the aldehyde function is linked by a covalent bond to an alkene function of a terpenoid. Notably, the two isomers of citral, geranial and neral, and their derivatives can be mentioned.

Unexpectedly, the inventors have discovered that the imine and aldehyde functions can exchange their substituents according to the following reaction:

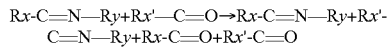

Preferably, the carbon atom of the imine functions and the carbon atom of the aldehyde functions are linked directly to an aryl or heteroaryl group or to the alkene function of a terpenoid.

The number and position of the cross-links will vary depending on the compounds used and the relative concentrations of these compounds. For example, the polymer could contain one cross-link for every 1000 monomer units. The number of cross-links in the polymers of the invention may vary from one cross-link for every 5000 units to one cross-link for every 3 units, preferably from one cross-link for every 2000 units to one cross-link for every 6 units, more preferably from one cross-link for every 1000 units to one cross-link for every 20 units, still more preferably from one cross-link for every 500 units to one cross-link for every 80 units.

The composition may also comprise one or several non-polymerisable aldehyde molecules, said to be "free". The aldehyde may be added before, during or after the polymerisation reaction.

The aldehyde is a molecule comprising at least one —CHO group. In particular, the aldehyde is a molecule in which the aldehyde —CHO function(s) is/are carried by an aromatic group, preferably a benzene ring. Notably, benzaldehyde and its derivatives can be mentioned. Preferably, the aldehyde is a molecule in which the aldehyde —CHO function(s) is/are linked by a covalent bond to an alkene function of a terpenoid. Notably, the two isomers of citral, geranial and neral, and their derivatives can be mentioned.

The use of aldehydes, and more particularly of aromatic aldehydes, such as benzaldehyde and its derivatives, such as vanillin, and terpenoid aldehydes, such as cinnamaldehyde, as imine metathesis catalysts presents many advantages. These molecules are compatible with vinylic monomers that are polymerisable by radical polymerisation; these molecules are unlikely to introduce parasite reactions in the polymer matrices/materials; these molecules are commercially available, can be biosourced or are of natural origin; and many aromatic aldehydes have low toxicity or are non-toxic, as is shown by their use in the food and cosmetics industries.

When the polymerisation is carried out in the presence of one or more non-polymerisable aldehyde molecules, the mole fraction of aldehyde molecule calculated with respect to the cross-linking agent may vary from 0.1% to 1000%, preferably from 1% to 250%, still more preferably from 5% to 100%.

As illustrated in the examples below, the presence of a non-polymerisable aldehyde will catalyse the imine-imine metathesis and imine-aldehyde exchange reactions.

In the invention, the molar ratio [monomer precursor of the polymer of interest]:[monomer comprising at least one pending imine group+monomer comprising at least one pending aldehyde group+compound of formula (I)] is preferably between 0.01 and 500, more preferably between 0.1 and 100, still more preferably between 1 and 50.

The molar ratio [monomer precursor of the polymer of interest]:[monomer comprising at least one pending imine group+monomer comprising at least one pending aldehyde group] is preferably between 0.01 and 500, more preferably between 0.1 and 100, still more preferably between 1 and 50.

The molar ratio [compound of formula (I)]:[monomer comprising at least one pending imine group+monomer comprising at least one pending aldehyde group] is preferably between 5 and 0.001, more preferably between 1 and 0.005, still more preferably between 0.5 and 0.01.

The molar ratio [monomer precursor of the polymer of interest]:[monomer comprising at least one pending imine group+monomer comprising at least one pending aldehyde group+monomer comprising at least one pending imine group linked to the polymerisable group by its nitrogen atom] is preferably between 0.01 and 500, more preferably between 0.1 and 100, still more preferably between 1 and 50.

The molar ratio [monomer comprising at least one pending imine group linked to the polymerisable group by its nitrogen atom]:[monomer comprising at least one pending imine group+monomer comprising at least one pending aldehyde group] is preferably between 500 and 0.002, more preferably between 100 and 0.01, still more preferably between 40 and 0.025.

The physical and chemical properties of the polymers of the invention depend strongly on the compounds used, in particular on the precursor monomers used.

Nevertheless, starting from a precursor monomer of a thermoplastic polymer, all the polymers combine the properties of a thermoplastic polymer with those of a thermoset. In particular, the polymer is insoluble like a thermoset but may be recycled and/or reshaped at a temperature higher than the glass transition temperature or the melting temperature of the polymer, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

The polymers of the invention have the advantage of showing thermosetting and thermoplastic properties. In particular, the polymers of the invention have at least one, more preferably several, still more preferably all, of the following properties:

thermal stability three-dimensional network, meaning that the polymer can be as insoluble as a thermoset polymer offcuts can be reused reshaping at a temperature higher than the glass transition temperature (Tg) or the melting temperature (Tf), preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

once cooled, it does not flow more than the reference polymer increase in chemical resistance malleable at high temperature possibility to reshape the polymers of the invention ability to relax all or some of the stresses present in the material objects may be manufactured by injection from these compositions objects may be manufactured by extrusion from these compositions objects may be manufactured by pressure moulding from these compositions objects may be manufactured by thermoshaping from these compositions objects may be manufactured by solvent casting from these compositions objects manufactured with these compositions may be repaired objects manufactured with these compositions may be welded objects manufactured with these compositions may be recycled degradable: degradation of the polymer leads to linear or branched polymer chains that may be reused.

When they are immersed in a solvent, preferably a good solvent, the polymers of the invention, preferably the cross-linked polymer networks of the invention, preferably show the remarkable property that they can be injected, notably through a syringe. Immersed in a good solvent, and depending on their degree of cross-linking, the cross-linked polymer networks of the invention, are injectable, notably through a syringe, while forming a network of cross-linked polymers that, when swollen by solvent, preferably water, can support its own weight and will not collapse on the scale of 30 seconds, preferably 1 minute, more preferably 2 minutes, still more preferably 5 minutes, still more preferably 10 minutes, still more preferably 30 minutes, still more preferably 1 hour, still more preferably 2 hours, still more preferably 4 hours, still more preferably 6 hours, still more preferably 8 hours, so more preferably 12 hours, still more preferably 1 day, without application of a strain.

When they are immersed in a solvent, preferably a good solvent, the cross-linked polymer networks of the invention, preferably show the property of aggregating together when they are left in contact.

The degree of cross-linking of the cross-linked polymers of the invention, preferably of the cross-linked polymer networks of the invention immersed in a good solvent, may be modulated by addition to the composition of free monofunctional aldehydes, and/or of free monofunctional imines, and/or of compounds of formula (I), and/or of polymers carrying aldehyde functional groups, or carrying pending imine functional groups linked to the polymer by the carbon atom, or carrying pending imine functional groups linked to the polymer by the nitrogen atom, or carrying aldehyde functional groups and pending imine functional groups linked to the polymer by the carbon atom. Such a modulation of the cross-linking degree may enable the release of molecules and/or polymers in the formulation containing the cross-linked polymers of the invention. The following are among the non-limiting examples of molecules or polymers that could be released: active substances, proteins, nucleic acids, amino acids, vitamins, flavours, catalysts, chemical reagents, pigments or other additives. The modulation of the cross-linking degree may be carried further to perform uncrosslinking.

The cross-linked polymers of the invention, preferably the cross-linked polymer networks of the invention, including assembled compositions of the invention, can be uncross-linked, and thus recycled, by addition of a compound (small molecule or polymer) comprising a primary amine function. The compound is preferably a monofunctional primary amine, in which the nitrogen atom of the amine function is linked to the carbon atom of an aliphatic group. The cross-linked polymers of the invention, preferably the cross-linked polymer networks of the invention, can be uncrosslinked, and thus recycled, using water under pressure, for example in a autoclave. The cross-linked polymers of the invention, preferably the cross-linked polymer networks of the invention, including assembled compositions of the invention, can be uncrosslinked, and thus recycled, by addition of a compound (small molecule or polymer) comprising an aldehyde function. Preferably, the aldehyde function is linked to the carbon atom of an aryl or heteroaryl group. The compound is preferably a monofunctional aldehyde. The cross-linked polymers of the invention, preferably the cross-linked polymer networks of the invention, including assembled compositions of the invention, can be uncrosslinked, and thus recycled, by addition of a compound (small molecule or polymer) comprising an imine function. Preferably, the carbon atom of the imine function is linked to the carbon atom of an aryl or heteroaryl group. The compound is preferably a monofunctional imine.

When the modulation of the cross-linking degree is carried out to perform uncrosslinking of the cross-linked polymers of the invention, preferably of the cross-linked polymer networks of the invention, including assembled compositions of the invention, the compound used to modulate the cross-linking density, preferably a monofunctional aldehyde where the aldehyde function is linked to the carbon atom of an aryl or heteroaryl group, preferably a monofunctional imine where the carbon atom of the imine function is linked to the carbon atom of an aryl or heteroaryl group, preferably water under pressure, for example in a autoclave, preferably a primary amine in which the nitrogen atom is linked to the carbon atom of an aliphatic group, is used in large excess as compared to the imine cross-links present in the cross-linked polymers of the invention, preferably of the cross-linked polymer networks of the invention, including assembled compositions of the invention. By large excess, it should be understood that the molar ratio of [compound used to modulate the cross-linking density in order to perform uncrosslinking]/[cross-links containing imine functions] is preferably greater than 50, more preferably greater than 100, more preferably greater than 150, more preferably greater than 200, more preferably greater than 500, and still more preferably greater than 1000.

The number average molar mass, $M_n$, of the linear or branched polymers obtained after degradation is preferably between 1500 g/mol and 2000000 g/mol, more preferably between 5000 g/mol and 500000 g/mol and still more preferably between 15000 g/mol and 200000 g/mol.

The dispersity, $Đ=M_w/M_n$, of the linear or branched polymers obtained after degradation is preferably between 1.01 and 15, more preferably between 1.10 and 10 and still more preferably between 1.5 and 5.

The composition according to the invention can also include loads and/or fillers and/or additives. The loads and/or fillers and/or additives are in particular those normally used by the person skilled in the art.

Furthermore, the composition can include, in the mixture or in the network, (an) other compatible polymer(s). The person skilled in the art knows how to choose such a polymer.

The polymer network compositions including at least one polymer network whose composition has been described above may also include: one or more polymers, pigments, colourants, blueing agents, fillers, plasticisers, impact modifiers, fibres, flame retardants, antioxidants, lubricants, wood, glass and metal.

Among the polymers that can be mixed with the polymer networks of the invention, examples include elastomers, thermosets, thermoplastic elastomers and impact-resistant polymers.

The term "pigments" designates coloured particles that are insoluble in the polymer network among the pigments that may be the invention, titanium dioxide, carbon black, carbon nanotubes, metallic particles, silica, metal oxides, metallic sulfites or any other mineral pigments may be cited. Other pigments that may be mentioned are phthalocyanines, anthraquinones, quinacridones, dioxazines, azo dyes or any other organic pigment and natural pigments (madder, indigo, rose madder, carmine, etc.) and pigment mixtures. The pigments can represents between 0.05% and 70% of the composition of the material.

The term "colourants" designates molecules that are soluble in the polymer network and have the ability to absorb all or some of the visible light rays.

The term "blueing agent" designates a molecule that absorbs ultraviolet light rays and then re-emits this energy by fluorescence in the visible spectrum. Blueing agents are notably used to give a certain whiteness.

Examples of fillers that may be used in the compositions of polymer networks of the invention are: silica, clays, calcium carbonate, carbon black and kaolins.

Examples of fibres that may be used in the compositions of polymer networks of the invention are: glass fibre, carbon fibre, polyester fibre, polyamide fibre, aramide fibre, polyethylene fibre, cellulose fibre and nano-cellulose. Organic fibres (linen, hemp, sisal, bamboo, etc.) may also be envisaged.

The presence in the compositions of polymer networks of the invention of pigments, colourants or fibres capable of absorbing radiation may be used to ensure the heating of an article obtained from these compositions of polymer networks of the invention by means of a radiation source, for example a laser. The presence in the compositions of polymer networks of the invention of electrically conducting pigments fibres or fillers such as carbon black, carbon nanotubes, carbon fibres, metallic powders, or magnetic particles, may be used to ensure the heating of an article obtained from these compositions of polymer networks of the invention by the Joule effect or by microwaves. Such heating procedures may enable the manufacture, transformation or recycling of an article obtained from the compositions of polymer networks of the invention as described below. Electrically conducting loads also enable electrostatic charges to be evacuated from the material or enable electrostatic painting.

It has been discovered that imine-imine metathesis reactions catalysed by an aldehyde are the most rapid. To the inventors' knowledge, the use of aldehyde to catalyse imine-imine metathesis reactions has not been previously described.

It has also been discovered that the imine and aldehyde functions can exchange their substituents according to the following reaction:

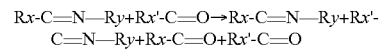

To the inventors' knowledge, the imine-aldehyde exchange reaction has not been previously described.

Preferably, the aldehyde used to catalyse the imine metathesis is an aromatic or terpenoid aldehyde, that is a molecule in which the aldehyde function is carried by an aryl, heteroaryl or terpenoid group.

Preferably, the carbon atom of the imine functions and the carbon atom of the aldehyde functions are linked directly to an aryl or heteroaryl group or to the alkene function of a terpenoid.

Another object of the invention is therefore the use of aldehyde to catalyse imine-imine metathesis reactions and imine-aldehyde exchange reactions. Another object of the invention is therefore a method to catalyse imine-imine metathesis reactions and imine-aldehyde exchange reactions, comprising adding an aldehyde in a composition comprising imine-functionalized compounds.

The aldehyde may be a non-polymerisable aldehyde compound or an aldehyde function present in the monomers and/or in the cross-linking agent.

Another object of the invention is a process for preparation of the polymers according to the invention. This process comprises a copolymerisation step starting from the monomers and compounds previously described.

The polymerisation is carried out under normal conditions that the person skilled in the art uses to polymerise the monomers that are precursors to the polymer of interest by radical polymerisation.

The polymerisation may be carried out according to the various methods of radical polymerisation well known to the person skilled in the art (The Chemistry of Radical Polymerization. 2nd ed., Authors: Moad, G.; Solomon, D. H., Publisher: Elsevier Ltd: 2006, p. 639; Handbook of Radical Polymerization, Authors: Matyaszewski, K.; Davis, T. P. Publisher: Wiley-Interscience: Hoboken, 2002; p. 936; Handbook of Polymer Blends and Composites, Authors: Kulshreshtha, A. K.; Vasile, C. © 2002 Publishers: Smithers Rapra Technology; ISBN-10: 1859573096 ISBN-13: 978-1859573099; Macromolecular Engineering: Precise Synthesis, Materials Properties, Applications; Authors: K. Matyjaszewski, Y. Gnanou, L. Leibler; Publishers: Wiley-VCH Verlag GmbH (Feb. 23, 2007), ISBN-10: 3527314466; ISBN-13: 978-3527314461.)

The copolymerisation may be carried out in mass or in solution, in the presence or not of free-radical generating compounds. The presence of free-radical generating compounds is preferable but not essential. For example, the person skilled in the art knows that styrene generates radicals that initiate polymerisation by raising the temperature. The free-radical generating compounds are well known to the person skilled in the art, and all radical initiators commonly used for the polymerisation of monomers that are precursors to polymers of interest may be used.

Depending on the type of radical initiator used, the polymerisation may be initiated by a increase in temperature (thermal initiator), by light irradiation (photochemical initiator) or by redox reactions (redox initiator).

If applicable, the catalyst for the imine metathesis reaction may be present in the reaction mixture to be polymerised. The catalyst may also be added after polymerisation, notably on use of the materials. If an aldehyde, catalyst for the imine metathesis reaction, is added to the reaction mixture, this may be added in the form of a polymerisable molecule or in the form of a non-polymerisable molecule.

Another object of the invention is the use of an imine-functionalised monomer carrying a group that is polymerisable by radical polymerisation, a compound comprising aldehyde and/or imine functions, and a monomer precursor to a polymer of interest carrying a group that is polymerisable by radical polymerisation for the preparation of a cross-linked polymer network containing exchangeable pending links and exchangeable cross-links.

The imine-functionalised monomer is as described previously.

The compound comprising aldehyde and/or imine functions is as described previously.

The monomer precursor to a polymer of interest carrying a group that is polymerisable by radical polymerisation is as described previously.

Another object of the invention is the use of an aldehyde-functionalised monomer carrying a group that is polymerisable by radical polymerisation, a compound comprising imine functions, and a monomer precursor to a polymer of interest carrying a group that is polymerisable by radical polymerisation for the preparation of a cross-linked polymer network containing exchangeable pending links and exchangeable cross-links.

The aldehyde-functionalised monomer is as described previously.

The compound comprising imine functions is as described previously.

The monomer precursor to a polymer of interest carrying a group that is polymerisable by radical polymerisation is as described previously.

Another object of the invention is a material obtained from the composition according to the invention.

Another object of the invention is a preparation process of a material according to the invention, comprising the following steps:
  Preparation of a composition according to the invention by radical copolymerisation of the compounds defined previously;
  Shaping of the composition obtained at the radical copolymerisation step.

The concept of shaping also includes the compounding of the composition in the form of granules or powder, for example in the preparation of finished products. The shaping may also be carried out by processes known to the person skilled in the art for the shaping of thermoplastic or thermosetting polymers. Notably, the processes of moulding, compression, injection and extrusion may be mentioned. Before having the form of the finished object, the material will usually be in the form of granules or powder.

Another object of the invention is a process for recycling a material obtained including the following successive steps: a) reduction of the material to a powder by mechanical grinding; b) transformation of the particles from step a) by applying a mechanical stress to the particles at a temperature (T) higher than the glass transition temperature (Tg) or the melting temperature (Tf) of the polymer, preferably higher than Tg or Tf+10° C., more preferably higher than Tg or Tf+20° C., still more preferably higher than Tg or Tf+40° C., still more preferably higher than Tg or Tf+80° C., if the glass transition temperature or the melting temperature is lower than 25° C.

Another object of the invention is a formulation comprising a composition according to the invention.

The following examples illustrate the invention without limiting the scope thereof.

A. SYNTHESES OF MONOMERS

A.1. Aldehyde Monomer C

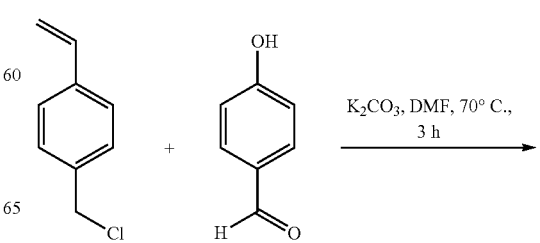

-continued

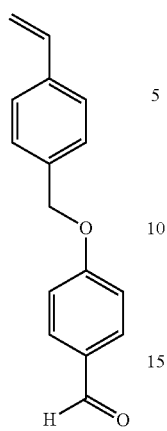

Figure 1:
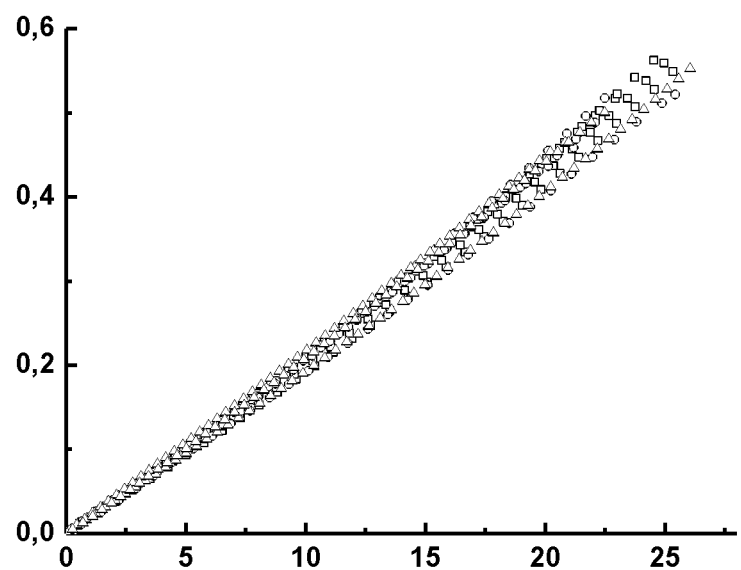
FIG. 1: Traction tests at 100° C. on dog-bone shaped specimen (1st generation; symbol: square) and on dog-bone shaped specimen recycled once ($2^{nd}$ generation; symbol: triangle) or twice (3rd generation; symbol: circle). Evolution of the stress [MPa] as a function of elongation [%]. A butyl methacrylate network containing pending imine functions, prepared according to procedure D1 but using 3 times more cross-linking agent D1, was used to generate the specimen.

p-Chloromethylstyrene (6.63 g, 43.4 mmol), 4-hydroxybenzaldehyde (6.25 g, 51.1 mmol) and potassium carbonate ($K_2CO_3$) (17.7 g, 127.9 mmol) are mixed in a 250 mL flask containing 75 mL of dimethylformamide (DMF). The mixture is stirred under nitrogen for 3 hours at 70° C. The mixture is then poured into 500 mL of water, and extracted three times with 150 mL of ethyl acetate. The combined organic phases are washed with brine 0.5 M (3×150 mL), dried over magnesium sulfate ($MgSO_4$) and the mixture is concentrated under reduced pressure to yield a slightly yellow liquid. The solid is put in 100 mL of heptane and the mixture is stirred at 50° C. for 1 hour. The solid is filtered and dried to yield the aldehyde monomer C as a white solid (8.7 g, 36.3 mmol, 84%).

$^1$H NMR (CDCl$_3$, 400 MHz) δ: 9.89 (s, 1H), 7.84 (d, 2H, J=8.8 Hz), 7.42 (m, 4H), 7.07 (d, 1H, J=8.8 Hz), 6.73 (dd, 1H, J=17.6 Hz, 10.8 Hz), 5.77 (d, 1H, J=17.6 Hz), 5.28 (d, 1H, J=10.8 Hz), 5.14 (s, 2H).

GC MS: 97%, ( ) m/z: [M] Calculated for C16H14O2: 238.0944. Found: 238.20.

A.2. Imine Monomer B

-continued

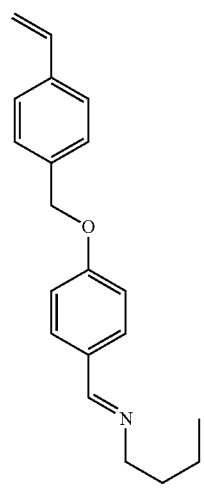

The aldehyde monomer C (5 g, 21 mmol) and n-butylamine (7.67 g, 105 mmol) are dissolved in 40 mL of tetrahydrofuran (THF). Some anhydrous $MgSO_4$ is added and the reaction mixture is stirred for 48 hours at room temperature (RT). The mixture is filtered and concentrated under reduced pressure to yield the imine monomer B as a white solid (5.85 g, 19.9 mmol, 95%).

$^1$H NMR (CDCl$_3$, 400 MHz) δ: 8.20 (s, 1H), 7.66 (d, 2H, J=8.8 Hz), 7.41 (m, 4H), 6.99 (d, 2H, J=8.8 Hz), 6.73 (dd, 1H, J=17.6 Hz, 10.8 Hz), 5.77 (d, 1H, J=17.6 Hz), 5.27 (d, 1H, J=10.8 Hz), 5.09 (s, 2H), 3.58 (t, 2H, J=7.2 Hz), 1.67 (m, 2H), 1.38 (m, 2H), 0.95 (t, 3H, J=7.2 Hz).

$^{13}$C NMR (CDCl$_3$, 100 MHz) δ: 160.5, 160.0, 137.4, 136.4, 136.2, 129.6, 129.5, 127.8, 126.5, 114.9, 114.2, 69.8, 61.4, 32.2, 20.5, 14.0

GC MS: 96%, ( ) m/z: [M] Calculated for $C_{20}H_{30}NO$ 293.4027. found 293.25.

A.3. Cross-Linking Agent D: $D_1$

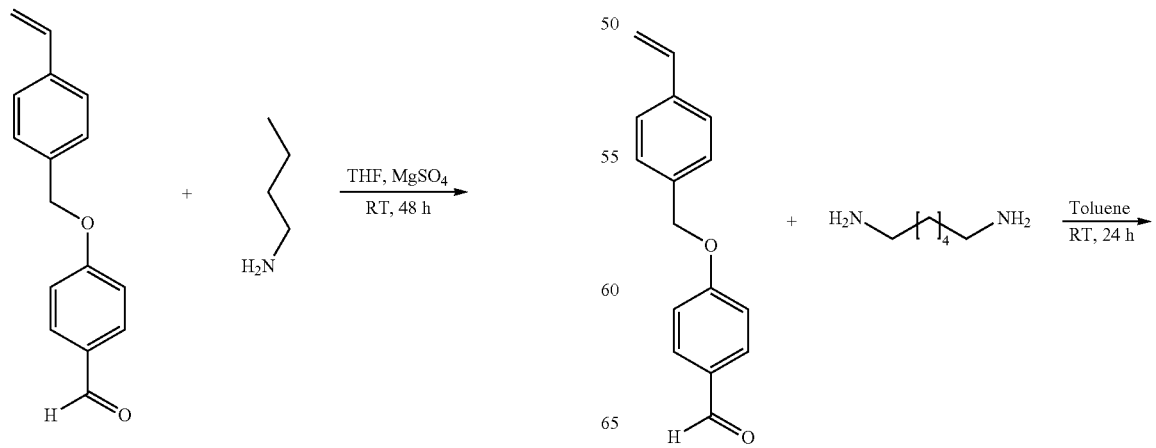

-continued

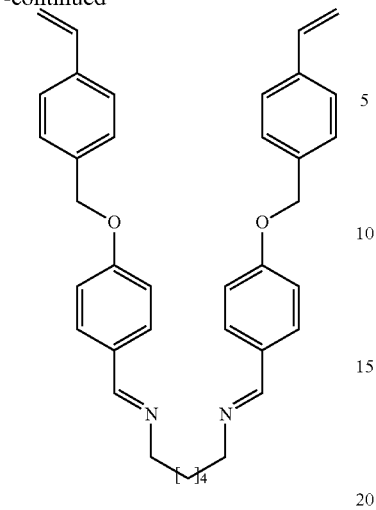

The aldehyde monomer C (12.0 g, 50.34 mmol) and 1,6-hexanediamine (5.83 g, 50.34 mmol) are mixed in 150 mL of toluene and the mixture is stirred for 24 hours at RT. The white precipitate formed during the reaction is filtered, washed three times with 150 mL of methanol and dried to yield the cross-linking agent $D_1$ as a white solid (9.5 g, 17.1 mmol, 70%).

$^1$H NMR (CDCl$_3$, 400 MHz) δ: 8.19 (s, 2H), 7.66 (d, 4H, J=8.8 Hz), 7.41 (m, 8H), 6.99 (d, 4H, J=8.8 Hz), 6.73 (dd, 2H, J=17.6 Hz, 10.8 Hz), 5.77 (d, 2H, J=17.6 Hz), 5.27 (d, 2H, J=10.8 Hz), 5.08 (s, 4H), 3.57 (t, 4H, J=7.2 Hz), 1.70 (m, 4H), 1.41 (m, 4H).

$^{13}$C NMR (CDCl$_3$, 100 MHz) δ: 160.7, 160.1, 137.5, 136.4, 136.2, 129.6, 127.7, 126.5, 114.9, 114.3, 69.8, 61.7, 31.0, 27.2.

A.4. Cross-Linking Agent D: $D_2$

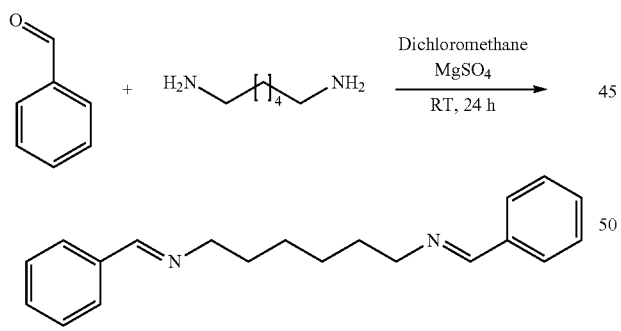

Benzaldehyde (2.05 equivalents) and 1,6-hexanediamine (1 equivalent) are mixed in dichloromethane (2 mL per mol of 1,6-hexanediamine) and MgSO$_4$ (3 equivalents) is added. The reaction mixture is stirred at RT for 24 hours, filtered and concentrated under reduced pressure to yield the cross-linking agent $D_2$ as a yellow oil (98%, in the presence of 7 mol % of benzaldehyde).

$^1$H NMR (CDCl$_3$, 400 MHz) δ: 8.26 (s, 1H), 7.72 (m, 2H), 7.38 (m, 3H), 3.63 (t, J=6.8 Hz, 2H), 1.74 (m, 2H), 1.42 (m, 2H).

$^{13}$C NMR (CDCl$_3$, 100 MHz) δ: 161.2, 136.2, 130.4, 128.6, 128.1, 62.0, 30.8, 27.2.

A.5. Cross-Linking Agent D: $D_3$, Polyaldehyde Polymer

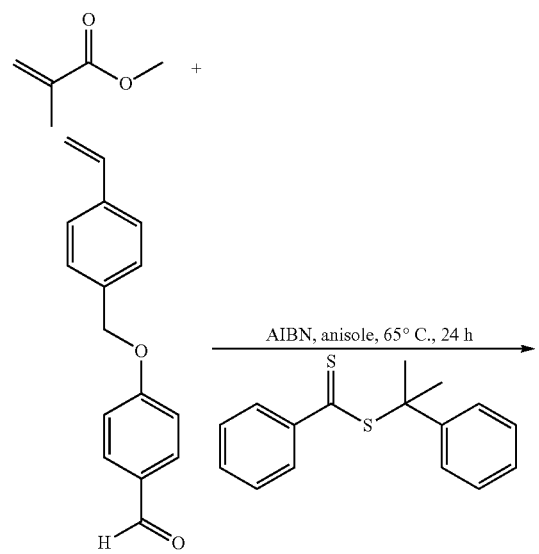

Methyl methacrylate (MMA) (3.36 g, 33.6 mmol), the aldehyde monomer C (2.0 g, 8.39 mmol), 2-phenyl 2-propyl benzodithioate (47.8 mg, 0.176 mmol) and azobisisobutyronitrile (AIBN) (11.0 mg, 0.068 mmol) are mixed in a Schlenk flask containing 3.6 mL of anisole. The resulting reaction mixture is bubbled with nitrogen for 30 minutes before being stirred at 65° C. for 24 hours. The polymerization is stopped by placing the Schlenk tube in an ice bath at 0-2° C. The conversion of methyl methacrylate and aldehyde monomer C were found to be 84.4% and 92.3% respectively. The polymer is isolated via two successive precipitations into diethyl ether. The resulting slightly pink solid is dried under high vacuum at 50° C. for 2 hours. Size exclusion chromatography analysis (eluent THF, calibration PMMA) of the polymer give a molar mass $M_n$ of 23 200 g/mol and a dispersity Đ of 1.25.

A.6. Cross-Linking Agent D: $D_4$, Polyimine Polymer

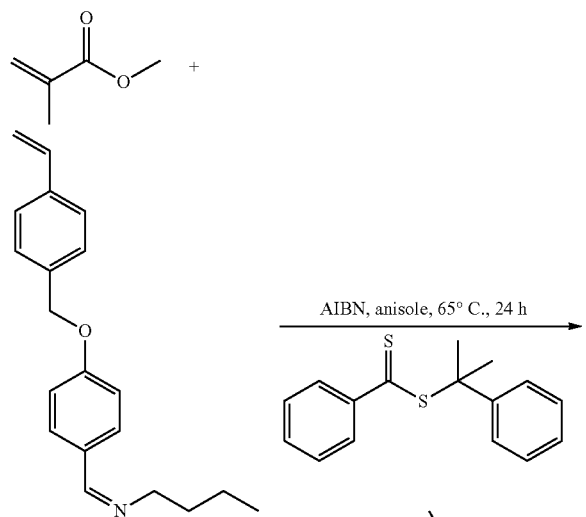

Methyl methacrylate (MMA) (4.09 g, 40.9 mmol), the imine monomer B (3 g, 10.2 mmol), 2-phenyl 2-propyl benzodithioate (55.7 mg, 0.2 mmol) and AIBN (13.4 mg, 0.08 mmol) are mixed in a Schlenk flask containing 1.5 mL of anisole. The resulting reaction mixture is bubbled with nitrogen for 30 minutes before being stirred at 65° C. for 24 hours. The polymerization is stopped by placing the Schlenk tube in an ice bath at 0-2° C. The conversion of methyl methacrylate and imine monomer B were found to be 84.3% and 99.4%, respectively. The polymer is isolated via two successive precipitations into diethyl ether. The resulting slightly pink solid was dried under high vacuum at 50° C. for 2 hours. Analysis by size exclusion chromatography (eluent THF, calibration PMMA) of the polymer gave a molar mass $M_n$ of 53 900 g/mol and a dispersity Ð of 1.52.

A.7. Monomer/Cross-Linking Agent B': $B'_1$

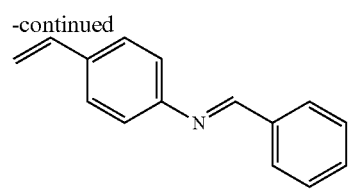

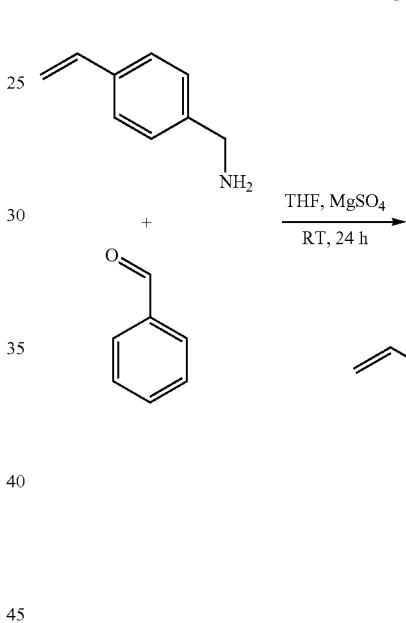

Benzaldehyde (0.9 mL, 8.8 mmol) and 4-vinylaniline (1 g, 8.4 mmol) are mixed in 20 mL of tetrahydrofuran and magnesium sulfate (1 g) is added. The reaction mixture is stirred for 24 hours at RT, filtered and concentrated under reduced pressure to yield the cross-linking agent $B'_1$ (90%, in the presence of 5 mol % of benzaldehyde).

$^1$H NMR (CDCl$_3$, 400 MHz) δ: 8.48 (s, 1H), 7.93-7.90 (m, 2H), 7.50-7.45 (m, 5H), 7.23-7.20 (m, 2H), 6.75 (dd, J=17.6 Hz, 10.8 Hz, 1H), 5.76 (d, J=17.6 Hz, 1H), 5.25 (d, J=10.8 Hz, 1H).

A.8. Monomer/Cross-Linking Agent B': $B'_2$

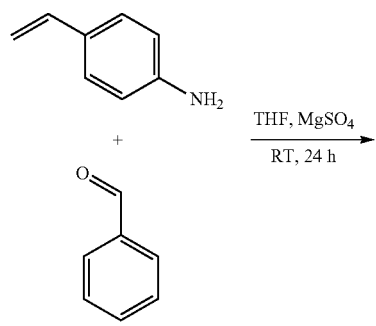

Benzaldehyde (0.24 mL, 2.4 mmol) and 4-vinylbenzylamine (0.3 g, 2.25 mmol) are mixed in 10 mL of tetrahydrofuran and magnesium sulfate (0.5 g) is added. The reaction mixture is stirred for 24 hours at RT, filtered and concentrated under reduced pressure to yield the cross-linking agent $B'_2$ (90%, in the presence of 5 mol % of benzaldehyde).

$^1$H NMR (CDCl$_3$, 400 MHz) δ: 8.40 (s, 1H), 7.81-7.78 (m, 2H), 7.44-7.31 (m, 7H), 6.73 (dd, J=17.6 Hz, 10.8 Hz, 1H), 5.74 (d, J=17.6 Hz, 1H), 5.25 (d, J=10.8 Hz, 1H), 4.83 (s, 2H).

B. KINETIC STUDIES OF EXCHANGE REACTIONS

These experiments aim at evaluating the conditions (time, temperature, catalyst) under which imine-imine, imine-amine and imine-aldehyde exchanges can be observed.

Kinetic Studies:

Stoichiometric quantities of imine compounds, amines or aldehydes are mixed in $CDCl_3$ and $^1$H-NMR spectra are recorded regularly. The compounds are mixed from stock solutions and the overall concentration of the two initial exchanging reactants is fixed at 0.071 mol/L (0.05 mmol/0.7 mL).

General Mixing Procedure:

$CDCl_3$ is introduced in the NMR tube and the reactants are added from their stock solutions using a micro syringe. The tube is hermetically sealed and shaken carefully before starting the analysis via NMR. The time elapsed between the end of the addition of all compounds and the first NMR spectrum recorded is ca. 3:30 minutes. For experiments at elevated temperature, the NMR spectrometer is equilibrated at the respective temperature prior sample addition. Room temperature during these experiments corresponds to 22.0 to 23.6° C. The following exchange reactions were studied:

Reaction scheme of the imine-imine metathesis reactions B.1, B.2, B.3, B.4, B.5

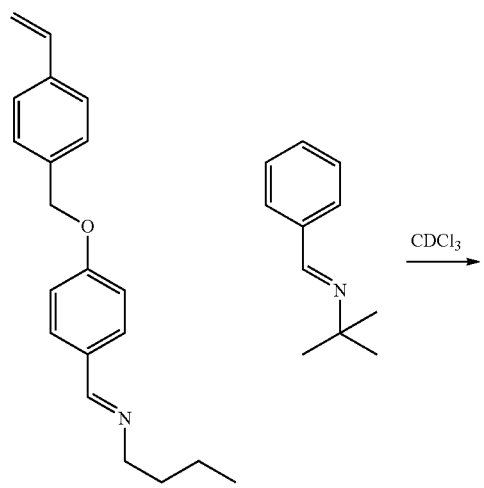

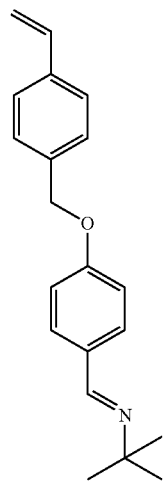

B.1. Uncatalyzed imine-imine metathesis at room temperature (RT)

B.2. Uncatalyzed imine-imine metathesis at 45° C.

B.3. Imine-imine metathesis in the presence of 10 mol % of amine (butylamine) at RT B.4. Imine-imine metathesis in the presence of 10 mol % of aldehyde (benzaldehyde) at RT B.5. Imine-imine metathesis in the presence of 10 mol % of aldehyde (benzaldehyde) at 45° C.

Reaction scheme of the imine aldehyde exchange reaction at RT B.6

B.6. Imine-aldehyde exchange reaction at RT

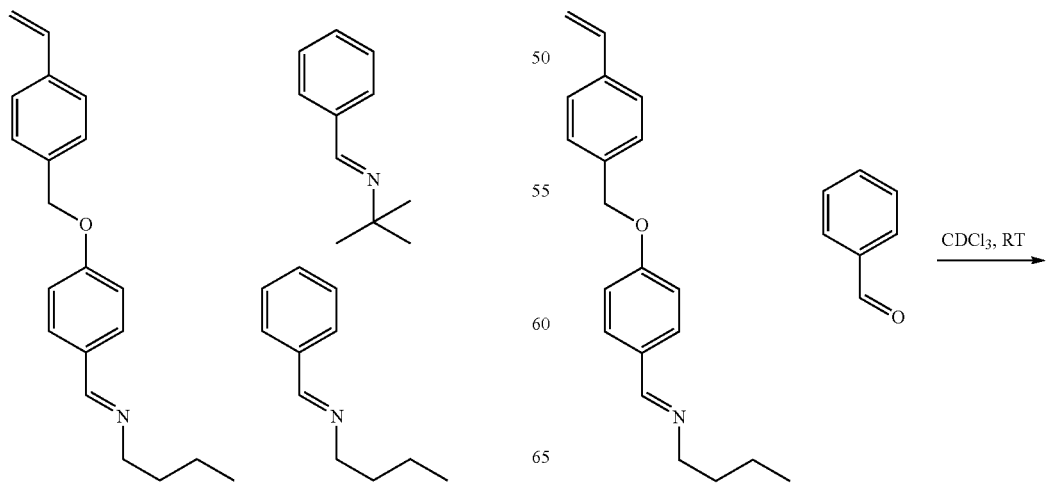

-continued

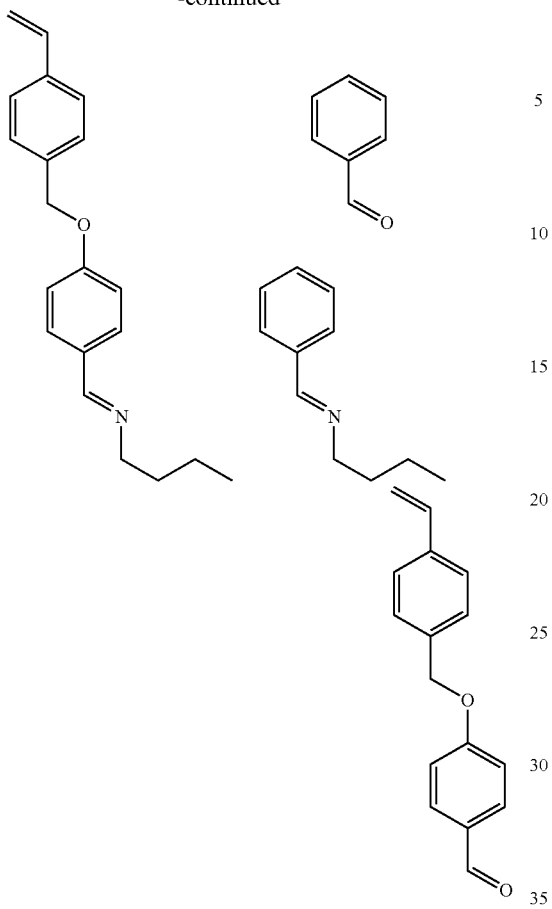

General Observations:

At the thermodynamic equilibrium, every compound should represent 25 mol % of the total amount of compounds (in the uncatalyzed experiment). The time required to form 15% of the two new compounds via metathesis or exchange reaction of the six studied reactions are given in the table below. This conversion threshold, which corresponds to a conversion of 60% towards the thermodynamic equilibrium, was chosen arbitrary to enable comparison of the different speeds of exchange.

TABLE 1

|  | Reaction: | | | | | |
| --- | --- | --- | --- | --- | --- | --- |
|  | 1 | 2 | 3 | 4 | 5 | 6 |
| Time [h] to generate 15% of N-n-butylbenzimine | 32.5 | 23 | 7.5 | 4.75 | 0.75 | 8.75 |
| Time [h] to generate 15% of monomer N-tert-butylimine | 32.5 | 23 | 12.5 | 4.75 | 0.75 | 8.75 |

The uncatalyzed imine-imine metathesis is the slowest exchange reaction of the studied exchange reactions. The addition of free aldehyde to the imine-imine metathesis reaction accelerates the exchange reaction by a factor of 7 at RT and a factor of 30 at 45° C. To our knowledge, the use of aldehyde as catalyst for the metathesis of imines has not been described yet. The imine-aldehyde exchange reaction was also proved to be faster than uncatalyzed imine-imine metathesis by a factor of ca. 3.5.

C. GENERATION OF NETWORKS

The quantity of each monomer can be adjusted according to the targeted final properties C.1. Butyl Methacrylate Network with Pending Imine Functions Using the Cross-Linking Agent $D_1$

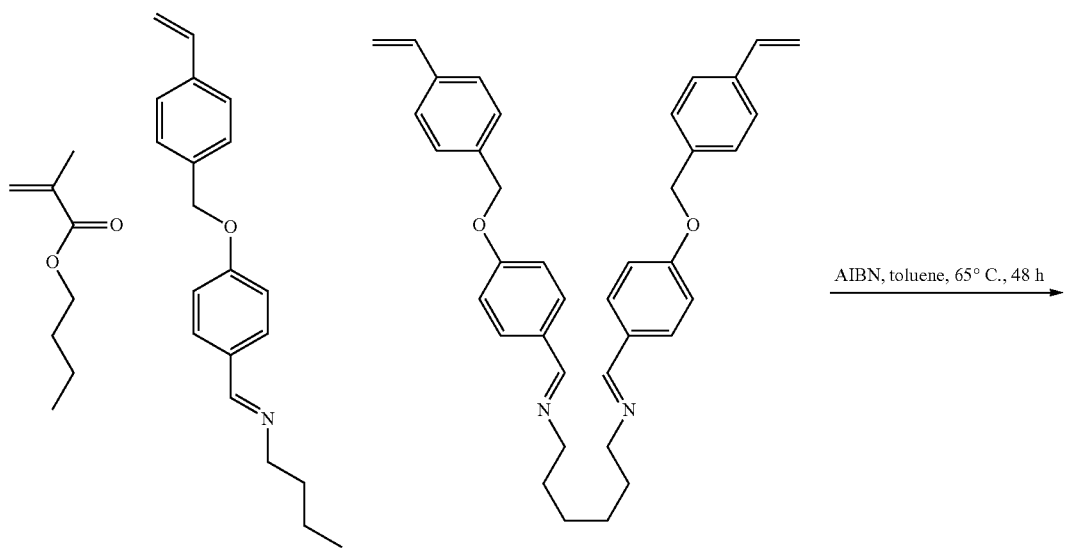

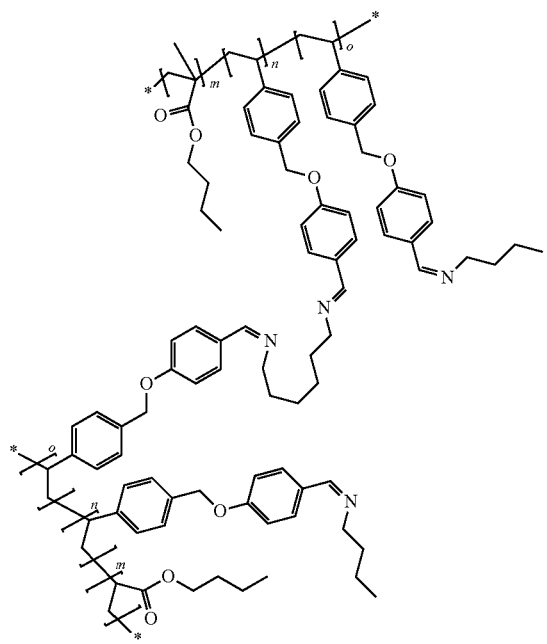

n-Butyl methacrylate (BMA) (11.9 g, 83.9 mmol), the imine monomer B (6.13 g, 20.9 mmol) and the cross-linking agent $D_1$ (292 mg, 0.525 mmol) are mixed with 7 mL of anisole in a glass vial capped with a septum. The reaction mixture is stirred at 50° C. for 15 minutes to fully dissolve all compounds. The solution is then cooled to RT and a solution of AIBN (27.6 mg, 0.168 mmol) in anisole (0.5 mL) is added to the reaction mixture. The solution is bubbled with nitrogen at RT for 30 minutes before being stirred at 65° C. for 48 hours. The resulting polymeric network is immersed in 300 mL of anhydrous THF for 6 hours before being filtered. This swelling/filtration procedure is repeated a second time and the polymer is dried under high vacuum at 100° C. for 30 hours.

C.2. Butyl Methacrylate Network with Pending Aldehyde Functions Using the Cross-Linking Agent $D_1$

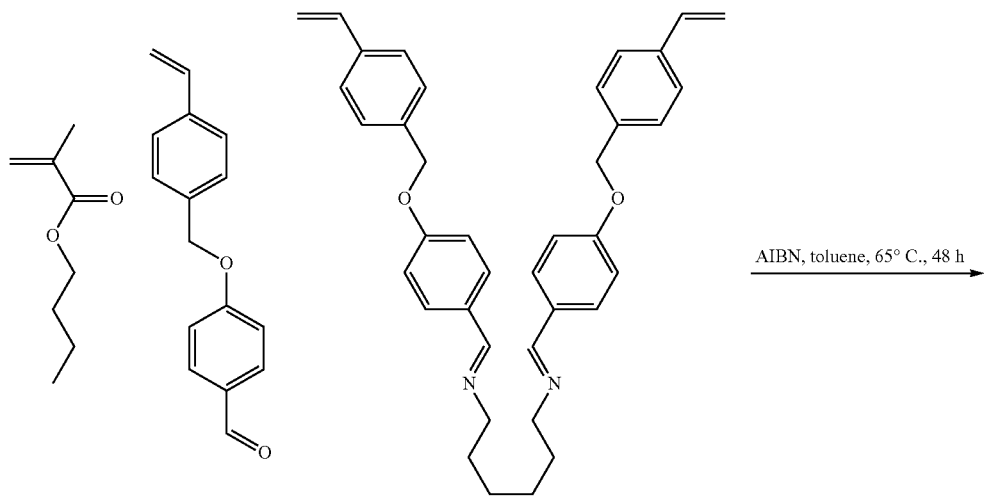

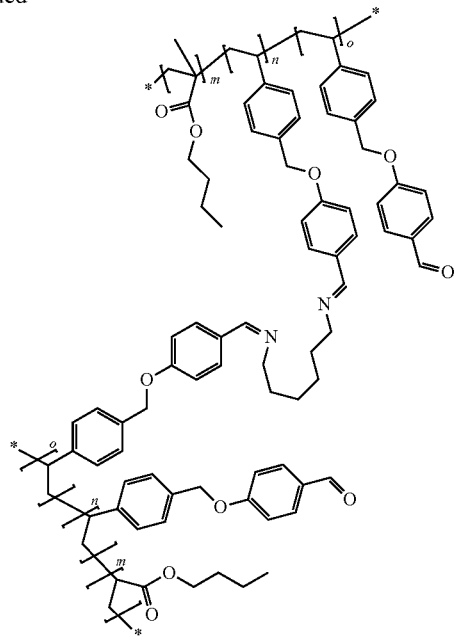

n-Butyl methacrylate (BMA) (11.9 g, 83.9 mmol), the aldehyde monomer C (4.98 g, 20.9 mmol) and the cross-linking agent $D_1$ (292 mg, 0.525 mmol) are mixed with 10 mL of anisole in a glass vial capped with a septum. The reaction mixture is stirred at 50° C. for 15 minutes to fully dissolve all compounds. The solution is then cooled to RT and a solution of AIBN (27.6 mg, 0.168 mmol) in anisole (0.5 mL) is added to the reaction mixture. The solution is bubbled with nitrogen at RT for 30 minutes before being stirred at 65° C. for 48 hours. The resulting polymeric network is immersed in 300 mL of anhydrous THF for 6 hours before being filtered. This swelling/filtration procedure is repeated a second time and the polymer is dried under high vacuum at 100° C. for 30 hours.

C.3. Butyl Methacrylate Network with Pending Aldehyde and Imine Functions Using the Cross-Linking Agent $D_1$

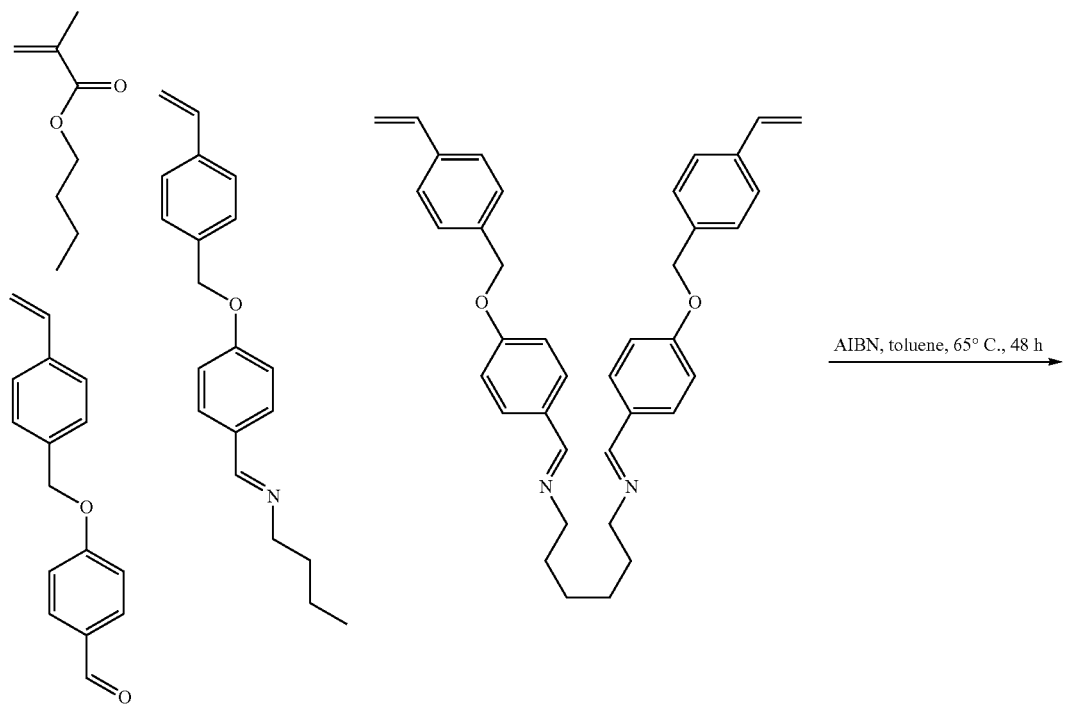

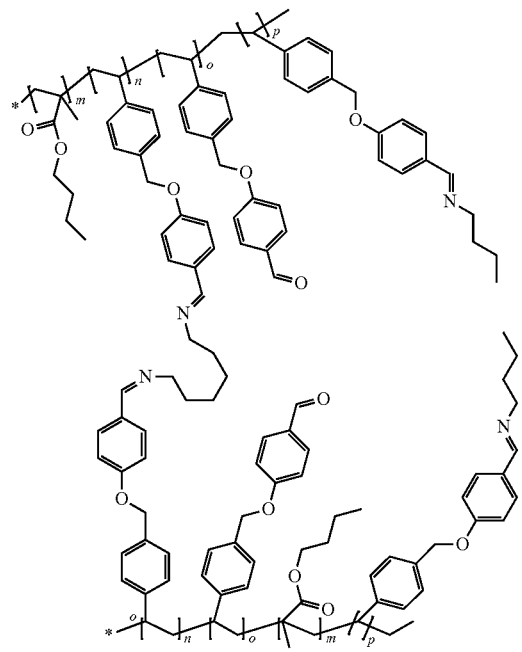

n-Butyl methacrylate (BMA) (11.9 g, 83.9 mmol), the imine monomer B (6.13 g, 20.9 mmol), the aldehyde monomer C (0.498 g, 2.09 mmol) and the cross-linking agent $D_1$ (292 mg, 0.525 mmol) are mixed with 7 mL of anisole in a glass vial capped with a septum. The reaction mixture is stirred at 50° C. for 15 minutes to fully dissolve all compounds. The solution is then cooled to RT and a solution of AIBN (27.6 mg, 0.168 mmol) in anisole (0.5 mL) is added to the reaction mixture. The solution is bubbled with nitrogen at RT for 30 minutes before being stirred at 65° C. for 48 hours. The resulting polymeric network is immersed in 300 mL of anhydrous THF for 6 hours before being filtered. This swelling/filtration procedure is repeated a second time and the polymer is dried under high vacuum at 100° C. for 30 hours.

C.4. Styrene Network with Pending Imine Functions Using the Cross-Linking Agent $D_1$

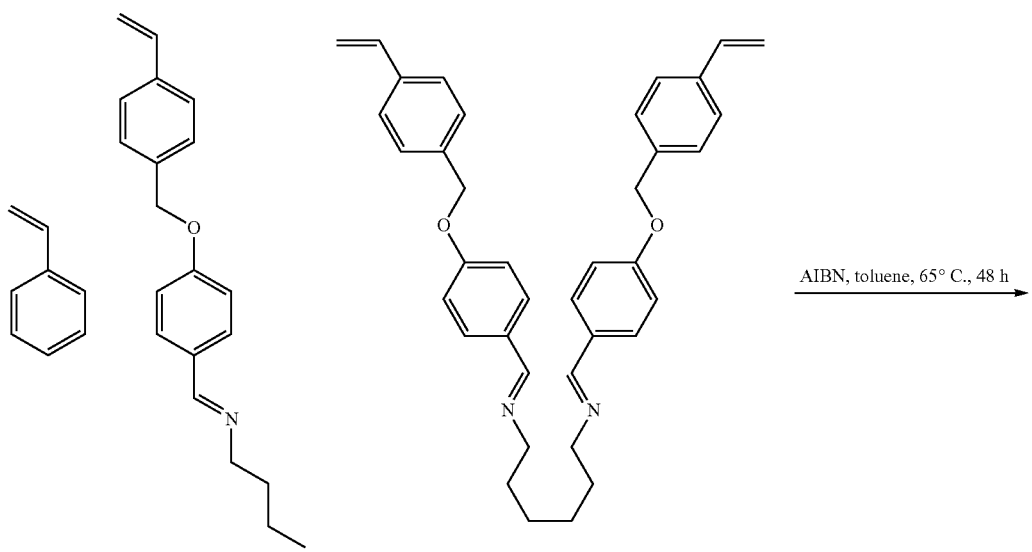

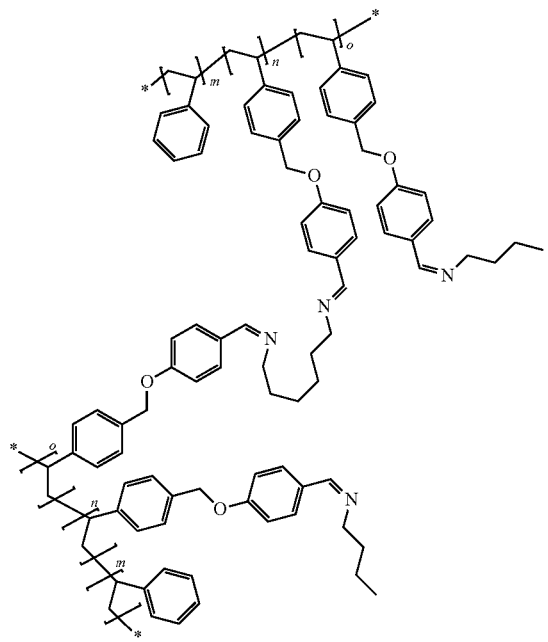

Styrene (St) (7.1 g, 68.2 mmol), the imine monomer B (5 g, 17 mmol), and the cross-linking agent $D_1$ (237 mg, 0.426 mmol) are mixed with 6 mL of anisole in a glass vial capped with a septum. The reaction mixture is stirred at 50° C. for 15 minutes to fully dissolve all compounds. The solution is then cooled to RT and a solution of AIBN (22.4 mg, 0.136 mmol) in anisole (0.5 mL) is added to the reaction mixture. The solution is bubbled with nitrogen at RT for 30 minutes before being stirred at 65° C. for 48 hours. The resulting polymeric network is immersed in 300 mL of anhydrous THF for 6 hours before being filtered. This swelling/filtration procedure is repeated a second time and the polymer is dried under high vacuum at 100° C. for 30 hours.

C.5. Methyl Methacrylate Network with Pending Aldehyde Functions Using the Cross-Linking Agent $D_2$

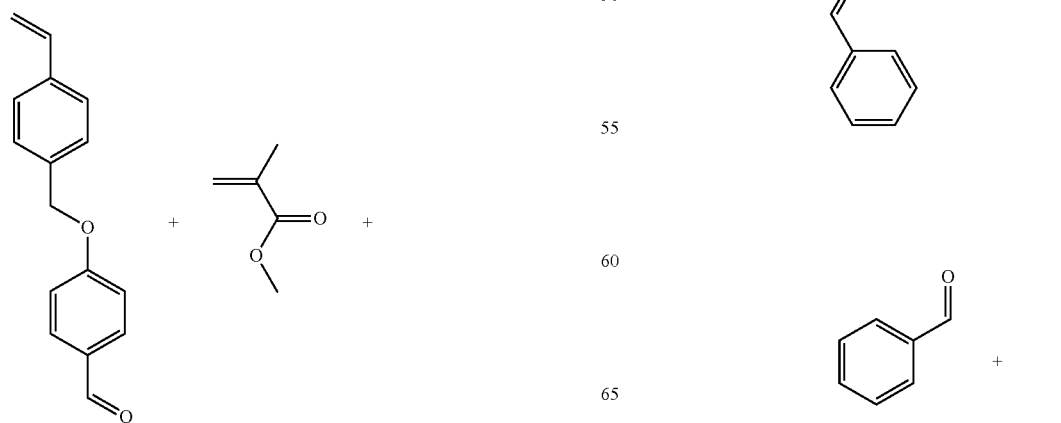

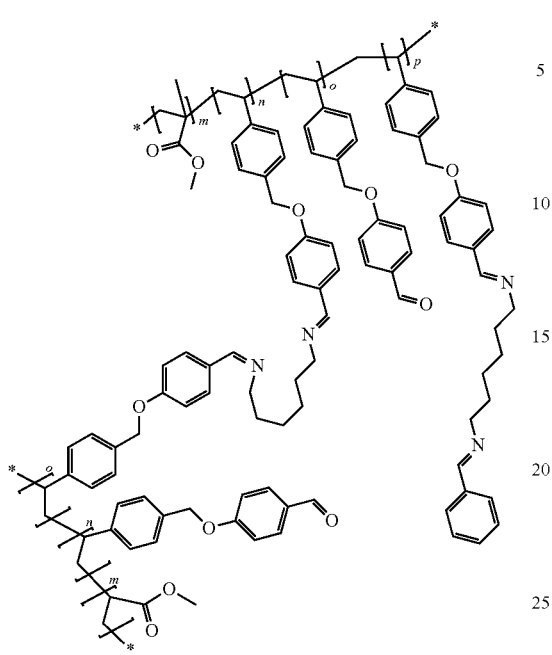

Methyl methacrylate (MMA) (1.79 mL, 16.8 mmol), the aldehyde monomer C (1 g, 4.2 mmol), the cross-linking agent $D_1$ (31.0 mg, 0.11 mmol) and AIBN (5.5 mg, 0.034 mmol) are mixed with 0.5 mL of anisole in a glass vial capped with a septum. The solution is bubbled with nitrogen at RT for 30 minutes before being stirred at 65° C. for 48 hours. The resulting polymeric network is immersed in 60 mL of anhydrous THF for 6 hours before being filtered. This swelling/filtration procedure is repeated a second time and the polymer is dried under high vacuum at 100° C. for 30 hours.

C.6. Methyl Methacrylate Network with Pending Aldehyde Functions Using the Cross-Linking Agent $B'_1$

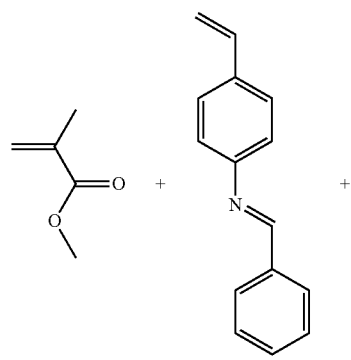

Methyl methacrylate (MMA) (1.79 mL, 16.8 mmol), the aldehyde monomer C (1 g, 4.2 mmol), the cross-linking agent $B'_1$ (22.2 mg, 0.11 mmol) and AIBN (5.5 mg, 0.034 mmol) are mixed with 0.5 mL of anisole in a glass vial capped with a septum. The solution is bubbled with nitrogen at RT for 30 minutes before being stirred at 65° C. for 48 hours. The resulting polymeric network is immersed in 60 mL of anhydrous THF for 6 hours before being filtered. This swelling/filtration procedure is repeated a second time and the polymer is dried under high vacuum at 100° C. for 30 hours.

C.7. Methyl Methacrylate Network with Pending Aldehyde Functions Using the Cross-Linking Agent B'$_2$

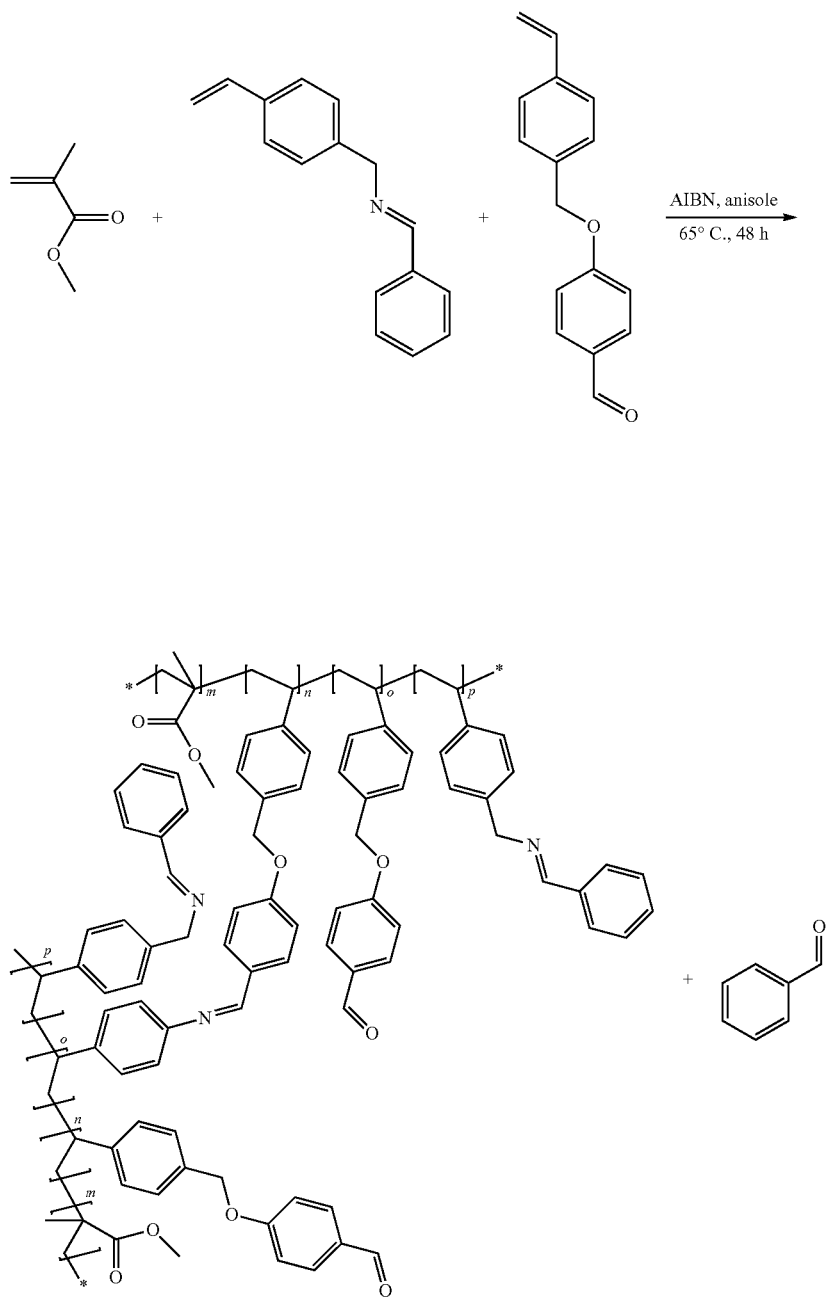

Methyl methacrylate (MMA) (1.79 mL, 16.8 mmol), the aldehyde monomer C (1 g, 4.2 mmol), the cross-linking agent B'$_2$ (23.8 mg, 0.11 mmol) and AIBN (5.5 mg, 0.034 mmol) are mixed with 0.5 mL of anisole in a glass vial capped with a septum. The solution is bubbled with nitrogen at RT for 30 minutes before being stirred at 65° C. for 48 hours. The resulting polymeric network is immersed in 60 mL of anhydrous THF for 6 hours before being filtered. This swelling/filtration procedure is repeated a second time and the polymer is dried under high vacuum at 100° C. for 30 hours.

C.8. Methyl Methacrylate Network Via Reversible Addition-Fragmentation Chain Transfer (RAFT) Radical Polymerization with Pending Aldehyde Functions Using the Cross-Linking Agent D₁

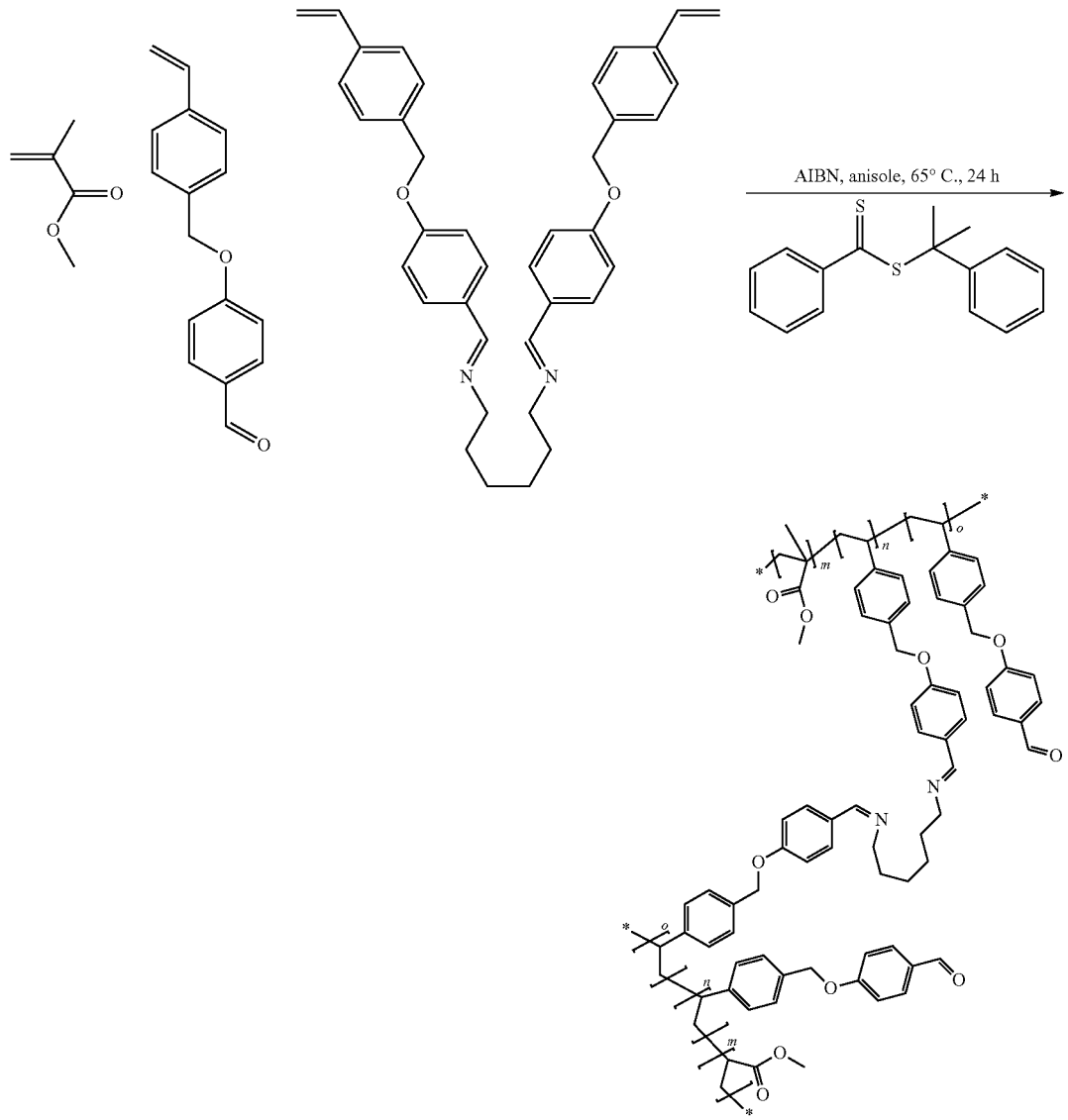

Methyl methacrylate (MMA) (18.9 g, 189 mmol), the aldehyde monomer C (11.2 g, 47.1 mmol), the cross-linking agent D1 (843 mg, 1.51 mmol) are mixed with 0.5 mL of anisole in a glass vial capped with a septum. The solution is bubbled with nitrogen at 65° C. for 10 minutes before being mixed with a degassed solution of AIBN (62.3 mg, 0.379 mmol) in anisole (5.8 m) and a degassed solution of 2-phenyl 2-propyl benzodithioate (PPBDT) (258.6 mg, 0.951 mmol) in anisole (5.0 mL). The resulting solution is stirred at 65° C. for 24 hours. The polymerization is stopped by immersing the polymer in 300-400 mL of anhydrous tetrahydrofuran for 16 hours and subsequent filtration. This swelling/filtration procedure is repeated a second time (7 hours) and the polymer is dried under high vacuum at 100° C. for 18 hours.

The network hence obtained using an initial monomer molar ratio $[MMA]_0/[C]_0/[D1]_0/[PPBDT]_0/[AIBN]_0 = 200/50/1.6/1/0.4$, is called N2.

Two other networks, called N1 and N4, have been prepared via the same procedure but using the following initial molar ratios:

N1: $[MMA]_0/[C]_0/[D]_0/[PPBDT]_0/[AIBN]_0 = 200/50/0.8/1/0.4$

N4: $[MMA]_0/[C]_0/[D1]_0/[PPBDT]_0/[AIBN]_0 = 200/50/3.2/1/0.4$

D. NETWORK CHARACTERIZATION

The tests presented below were performed on n-butyl methacrylate networks containing pending imine functions prepared via procedure (C1) described above.

D.1. Insolubility Tests: To Show that the Networks are Insoluble Like Thermosets The network is insoluble in THF, acetone, dimethylformamide, chloroform, dichloromethane, trichlorobenzene, toluene, anisole.

The solubility and swelling tests were performed following the procedure described below:

A sample of 265 mg of the dry network is immersed in 15 mL of anhydrous THF. The sample is kept immersed for 24 hours without stirring before the swollen gel is taken out off the flask and weighted. The gel is dried under high vacuum until constant weight (ca. 6 hours). This procedure is repeated two times more keeping the samples immersed in THF for 12 hours instead of 24 hours.

1st cycle, mass of the dry sample: 265 mg
1st cycle, mass of the swollen sample: 1.80 g
2nd cycle, mass of the dry sample: 242 mg
2nd cycle, mass of the swollen sample: 1.85 g
3rd cycle, mass of the dry sample: 238 mg
3rd cycle, mass of the swollen sample: 1.88 g

D.2. Swelling Tests on the Original/Pristine Material and the Recycled/Processed Material to Show that the Material can be Recycled/Reprocessed Like Thermoplastics The swelling tests were performed with a pristine sample after synthesis and with three samples recycled once. Recycling procedure: grinding into powder of the raw material after synthesis, pressing/compacting under a pressure of 10-11 tons at 60° C. for 5 hours. The swelling tests were performed in anhydrous THF. The mass of the respective sample was measured after 12 hours of swelling, which corresponds to the time at which the mass of the swollen samples was constant.

All samples were then dried and re-tested for their swelling properties under the same conditions to check for reproducibility. The results of these experiments are reported in the table below:

TABLE 2

| Swelling ratio (SR) $SR = (m_{swoll} - m_{dry})/m_{swoll}$ | Pristine | Recycled, n°1 | Recycled, n°2 | Recycled, n°3 |
| --- | --- | --- | --- | --- |
| $1^{er}$ swelling | 5.80 | 5.19 | 5.14 | 4.95 |
| $2^{nd}$ swelling | 6.64 | 5.37 | 5.40 | 5.51 |
| Soluble fraction (SF) $SF = (m_0 - m_{dry})/m_{dry}$ | Brut | Recycled, n°1 | Recycled, n°2 | Recycled, n°3 |
| $1^{er}$ swelling | 0.09 | 0.04 | 0.04 | 0.04 |
| $2^{nd}$ swelling | 0.02 | 0.06 | 0.04 | 0.04 |

$m_{swoll}$ = mass of the swollen sample,
$m_{dry}$ = mass of the dried sample,
$m_0$ = initial mass of the sample These swelling tests show that the recycled/processed samples are still insoluble, displaying similar swelling characteristics, and thus a similar cross-linking density, as the pristine material obtained right after synthesis. These observations indicate the absence or a very small quantity of side reactions during recycling and processing steps.

D.3. Traction Tests on the Original/Pristine Material and on the Recycled/Reprocessed Material: to Show that the Material can be Recycled/Reprocessed Like Thermoplastics A butyl methacrylate network containing pending imine functions, prepared via procedure C1 but using 3 times more of the cross-linking agent $D_1$, was used to prepare dog-bone samples for traction tests. Traction tests were performed on series of three samples at 100° C. After testing, the dog-bone shaped samples were ground into fine powder and re-used to generate new samples with a dog-bone shape ($2^{nd}$ generation). To do so, the powder is introduced in a mold placed under a pressure of 10-11 tons at 150° C. during 3 hours. After testing, these samples are recycled again, via the same procedure, to generate new samples with a dog-bone shape ($3^{rd}$ generation), which are then tested.

Traction tests: 5 minutes thermal equilibration at 100° C. followed by 1N/min

All dog-bone shaped samples broke in the middle section

The results are reported in FIG. 1 which shows the stress [MPa] as a function of elongation [%].

These traction tests indicate that the materials obtained from polymers described in this invention can be recycled without deteriorating their mechanical properties. No significant modification was observed either on the elastic modulus or on the force at break for samples recycled one or two times.

D.4. Changing the Shape of a Cross-Linked Polymeric Material: This is a Specific Property of Vitrimer Materials, to which the Polymers Described in the Invention can Belong It is impossible to give a new shape to a thermosetting material after curing/cross-linking.

Thermoplastic materials can be reshaped and reformed via heating above their glass transition temperature (or their melting/softening temperature for semi crystalline polymers), but they lose their shape/dimensional integrity and flow.

The materials prepared from polymers described in this invention, can be shaped and reformed after curing/cross-linking while being permanently chemically cross-linked, without losing their shape/dimensional integrity. Such a property is very useful from an application point of view, because it should allows "recalibration" of pieces that present conformity defects (e.g. damages/deformations) from their production processes.

With the aim to illustrate this property, a butyl methacrylate network containing pending imine functions, prepared via procedure (C1) described above, was used to prepare a flat ribbon. The glass transition temperature (Tg) of this material was determined via dynamic mechanical analysis (DMA) to be 58° C.

The ribbon was heated to 90° C. (in an oven), i.e. above the materials Tg, and twisted at this temperature. The ribbon was immediately cooled down to room temperature while maintaining it twisted. The ribbon then keeps its twisted shape at room temperature. If the ribbon is heated another time at 90° C., it untwists to its initial flat shape. However, if the twisted ribbon is hold in this twisted shape at 90° C. for 90 minutes, the twisted shape becomes the new equilibrium shape of the material. Consequently, the material will keep this twisted state at room temperature as well as at temperatures above its Tg.

Keeping the ribbon twisted at 90° C. for 90 minutes allows the material to reach a new topology of equilibrium via imine-imine or aldehyde-imine exchange reactions (depending on the materials composition) between pending functional groups and cross-links of the polymer network.

D.5. Stress Relaxation

Figure 2:
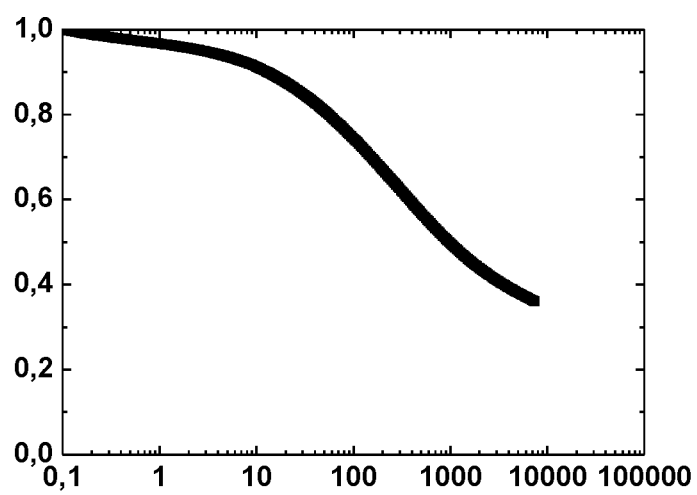
FIG. 2: Stress relaxation normalized at 150° C. of a polymeric material prepared from a butyl methacrylate network containing pending imine functions synthesized according to procedure D1 (evolution of $G(t)/G(0)$ as a function of time (seconds)).

Despite being made of a permanent and insoluble polymer network, samples and pieces prepared with the polymers described in this invention have the ability to relax the stress trapped during their fabrication or assembly for example. This property is very important for application standpoint because it could allow to prevent failure and malfunction and/or to maximize the life-cycle of pieces and parts. To illustrate this property, a disc made from a butyl methacrylate network containing pending imine functions prepared via the procedure (C1) described above, is deformed by applying 5% shear strain at 150° C. The evolution of the stress in the material as a function of time was then monitored. Thanks to imine-imine exchange reactions or aldehyde-imine exchange reactions (depending on the composition of the material) between pending functions and cross-links of the polymer network, more than 50% of the stress is relaxed within 20 minutes (see FIG. 2).

Similarly, samples of methyl methacrylate network containing pending aldehyde functions, N1, N2 and N4 were tested in stress relaxation experiments. To do this, the samples were prepared via compression molding of their powder for 3 hours at 150° C. under a pressure of 3-6 tons. The stress relaxation tests were performed on an ARES G2 rheometer in parallel plate geometry with a diameter of 25 mm at 150° C. and imposing a shear strain of 3%.

Figure 3:
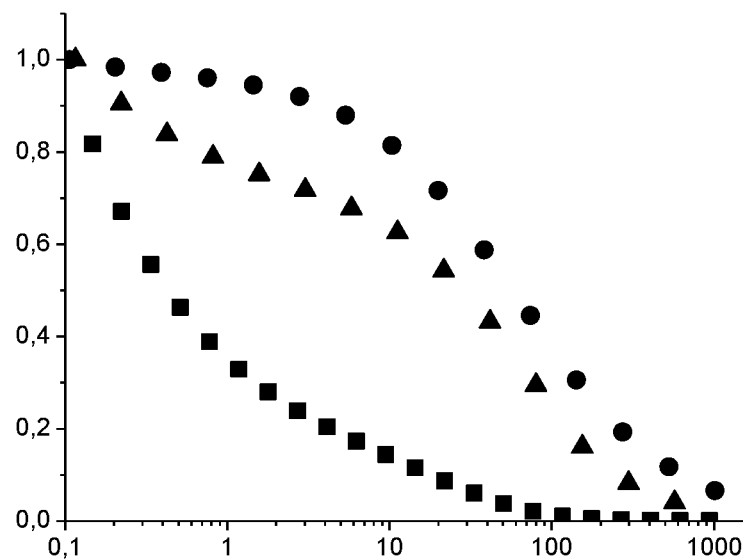
FIG. 3: Shear relaxation modulus normalized by the initial modulus at t=0 ($G(t)/G(0)$, ordinate, without unit) as a function of time (abscissa, seconds) of samples of a methyl methacrylate network containing pending aldehyde functions N1 (square), of a methyl methacrylate network containing pending aldehyde functions N2 (triangle), of a methyl methacrylate network containing pending aldehyde functions N4 (circle).

FIG. 3 represents the shear relaxation modulus normalized by the initial module at t=0 (ordinate, without unit) as a function of time (abscissa, seconds) of samples of methyl methacrylate network containing pending aldehyde functions N1 (square), of samples of methyl methacrylate network containing pending aldehyde functions N2 (triangle), of samples of methyl methacrylate network containing pending aldehyde functions N4 (circle). These experiments indicate that the cross-linked polymer networks described in the invention can totally or partially relax stress at temperature superior to their glass transition temperature.

E. PROCESSING BY EXTRUSION OF POLYMER NETWORKS CONTAINING PENDING BONDS AND CROSS-LINKS EXCHANGEABLE VIA ALDEHYDE-IMINE EXCHANGE REACTION AND/OR VIA IMINE-IMINE EXCHANGE REACTION

The following example illustrates the possibility to process via extrusion cross-linked polymer networks described in the invention.

3.4 g of a cross-linked polymer network N2 are introduced into a bivis DSM micro 5 cc extrusion machine. Extrusion is performed at 200° C. using a rotational screw speed of 60 rounds per minute, an injection time of 1 minute and a circulation time of 7 minutes. After injection of all the cross-linked polymer network, the force measured by the screws reaches a plateau of 3000 N. In total, 3.0 g of the cross-linked polymer network were extruded.

F. ATTEMPT TO PROCESS A CROSS-LINKED POLY(METHYL METHACRYLATE) NETWORK CONTAINING PENDING ALDEHYDE FUNCTIONS BUT NO EXCHANGEABLE IMINE CROSS-LINKS

The experiment presented below shows that cross-linked poly(methyl methacrylate) networks containing pending aldehyde functions but no exchangeable imine functionalities in their cross-links cannot be processed by compression molding techniques like the cross-linked polymer networks described in the invention.

A cross-linked PMMA network containing pending aldehyde functions was synthesized via a procedure similar to the one used for cross-linked polymer networks N2 but by replacing the cross-linking agent D1 by a cross-linking agent which does not contain imine functionalities, namely the 1,6-hexanediol dimethacrylate.

The detailed procedure for the synthesis of this cross-linked polymer network is described below. Methyl methacrylate (MMA) (4.0 g, 40.0 mmol), the aldehyde monomer C (2.38 g, 10.0 mmol) and 1,6-hexanediol dimethacrylate (81.4 mg, 0.32 mmol) are mixed in a glass vial capped with a septum. The solution is bubbled with nitrogen at 65° C. for 10 minutes before a degassed solution of AIBN (13.1 mg, 0.08 mmol) in anisole (1.2 mL) and a degassed solution of 2-phenyl 2-propyl benzodithioate (PPBDT) (54.5 mg, 0.2 mmol) in anisole (1.2 mL) are added to the reaction mixture. The resulting reaction mixture is stirred at 65° C. for 24 hours. The polymerization is stopped by immersing the polymer in 150 mL of anhydrous tetrahydrofuran for 16 hours and subsequent filtration. This swelling/filtration procedure is repeated a second time (9 hours) and the polymer is dried under high vacuum at 100° C. for 18 hours.

The resulting cross-linked polymer network is ground into powder in order to be processed by compression molding. To do so, the powder is placed in a mould for 3 hours at 150° C. under a pressure of 3-6 tons. Via this procedure, a very crumbly and fragile material that breaks immediately when manipulated is obtained. This material is not transparent and the grains of the powder initially introduced into the mold are still visible.

G. PROCESSING BY INJECTION OF POLYMER NETWORKS CONTAINING PENDING BONDS EXCHANGEABLE VIA ALDEHYDE-IMINE EXCHANGE REACTION AND/OR VIA IMINE-IMINE EXCHANGE REACTION

The following example illustrates the possibility to process via injection molding cross-linked polymer networks described in the invention.

Figure 4:
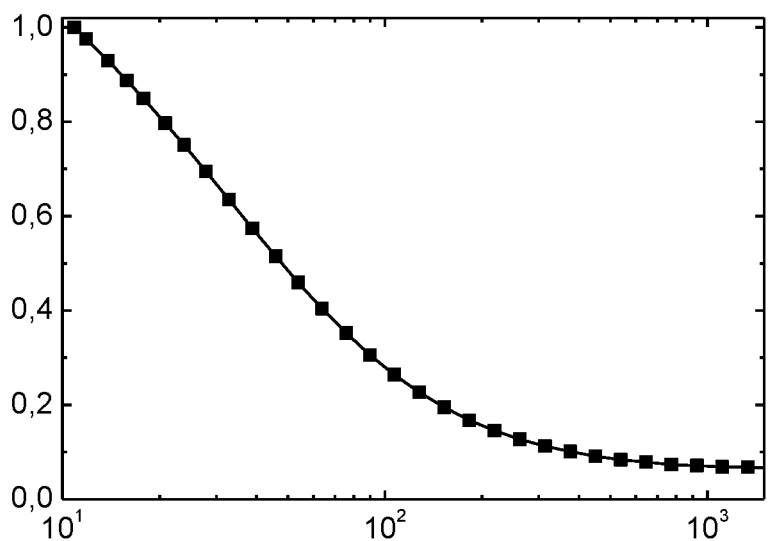
FIG. 4: Relaxation modulus in tensile mode normalized by the initial modulus at t=0 ($E(t)/E(0)$, ordinate, without unit) as a function of time (abscissa, seconds) of a sample of a cross-linked methyl methacrylate network containing pending aldehyde functions N4 prepared by injection molding.

3.0 g, respectively 2.4 g, of the cross-linked polymer network N4 are injection molded using a DSM Xplore micro 10 cc injection molding machine and a mold with a disc shape (diameter of 25 mm), respectively a mold with dog-bone shape (length ca. 7 cm). The mold is preheated to 200° C. before injection. The to-be-injected cross-linked polymer network N4 is introduced in the injection machine as a powder at room temperature. The polymer is heated to 200° C. (5 minutes) and equilibrated at this temperature for 1 more minute before being injected. The step of injection molding consists of 5 sub-steps: 2×30 seconds at 10 bar pressure followed by 2×30 seconds at 12 bar pressure and release of pressure. After injection, the mold containing the injected cross-linked polymer network N4 is kept at 200° C. for 1 minute before cooling via a water-cooling system during 5-10 minutes. The object prepared in this way by injection molding is insoluble in anhydrous THF (after 48 hours at room temperature), but can relax stress, as exemplified by the stress relaxation test performed in dynamic mechanical analysis (DMA) (FIG. 4). For this test, a sample is heated to 150° C. and equilibrated for 5 minutes at this temperature. The sample is elongated by 3% at 150° C. and the evolution of the stress is monitored as a function of time. Due to aldehyde-imine exchange reactions and imine-imine exchange reactions between pending functions and cross-links of the cross-linked polymer network, more than 80% of the stress is relaxed in 200 seconds (see FIG. 4).

The invention claimed is:

1. A composition comprising a network of cross-linked polymers, said network is prepared by radical copolymerisation of the following compounds:
   (a) Monomers, polymer of interest precursors, said monomers carrying at least one functional group that is polymerisable by radical polymerisation;
   (b) Monomers comprising at least one pending group chosen from imine, aldehyde and both and carrying at least one functional group that is polymerisable by radical polymerisation;
   (c) Cross-linking agent comprising groups chosen from imine, aldehyde and both enabling the formation of a cross-linked polymer network containing pending functions and cross-links exchangeable by aldehyde-imine exchange reactions, imine-imine exchange reactions or aldehyde-imine and imine-imine exchange reactions.

2. A composition according to claim 1, wherein the cross-linking agent is a compound including at least two pending and/or terminal imine, aldehyde, imine and aldehyde functions, chosen from among the compounds carrying:
   aldehyde functions; or
   imine functions linked by means of their carbon atom; or
   imine functions linked by means of their nitrogen atom; or
   aldehyde functions and imine functions linked by means of their carbon atom.

3. A composition according to claim 2, wherein the cross-linking agent is a compound of formula (I) below:

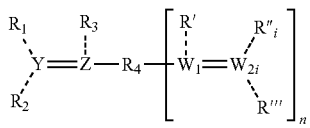

in which
n is a whole number between 1 and 6;
i is a whole number between 1 and n;
the dashed bond is present or absent, depending on the valence of Y, Z, $W_1$ and $W_2$;
Y and Z are different, and each represents either C or N; or Y is O and Z is C;
   when Y represents C, Z represents N and $R_1$ represents a hydrocarbon group, $R_2$ represents H and $R_3$ is absent;
   when Y represents N, Z represents C and $R_1$ represents H or a hydrocarbon group, $R_2$ is absent and $R_3$ represents H;
   when Y represents O, Z represents C and $R_1$ and $R_2$ are absent and $R_3$ represents H;
$R_4$ represents a hydrocarbon group
in each block $W_1(R')=W_{2i}(R''_i)(R''')$,
   $W_1$ and $W_{2i}$ are different, and each represents either C or N; or $W_{2i}$ is O and $W_1$ is C;
   when $W_{2i}$ represents C, $W_1$ represents N and R' is absent, $R''_i$ represents a hydrocarbon group and R''' represents H;
   when $W_{2i}$ represents N, $W_1$ represents C and R' represents H, $R''_i$ represents H or a hydrocarbon group and R''' is absent;
   when $W_{2i}$ represents O, $W_1$ represents C and $R''_i$ and R''' are absent and R' represents H;
when Z represents C, $W_1$ represents C;
when Y represents C, $W_{2i}$ represents C.

4. A composition according to claim 3, wherein none of the radicals $R_1$, $R_4$, or $R''_i$ in formula (I) carries a polymerisable functional group, the imine function is linked by its carbon atom to the functional group that is polymerisable by radical polymerisation in the monomer comprising at least one pending imine group, Z and $W_1$ represent N in the compound of formula (I).

5. A composition according to claim 3, wherein none of the radicals $R_1$, $R_4$, or $R''_i$ in formula (I) carries a polymerisable functional group, the imine function is linked by its nitrogen atom to the functional group that is polymerisable by radical polymerisation in the monomer comprising at least one pending imine group, Z and $W_1$ represent C in the compound of formula (I).

6. A composition according to claim 3, wherein none of the radicals $R_1$, $R_4$, or $R''_i$ in formula (I) carries a polymerisable functional group, the monomer comprising at least one pending aldehyde group is used in the absence of the monomer comprising at least one pending imine group, Z and $W_1$ represent N in the compound of formula (I).

7. A composition according to claim 3, wherein none of the radicals $R_1$, $R_4$, or $R''_i$ in formula (I) carries a polymerisable functional group, the compound of formula (I) is a polyaldehyde, the monomer comprising at least one pending imine group is present and the imine function in this compound is linked by its nitrogen atom to the functional group that is polymerisable by radical polymerisation.

8. A composition according to claim 3, wherein at least one of the radicals $R_1$, $R_4$, or $R''_i$ in formula (I) carries at least one functional group that is polymerisable by radical polymerisation.

9. A composition according to claim 3, wherein the polymer is prepared by radical polymerisation of polymer-precursor monomers and of monomers comprising at least one pending imine group in the presence of the cross-linking agent of formula (I).

10. A composition according to claim 3, wherein the polymer is prepared by radical polymerisation of polymer-precursor monomers and of monomers comprising at least one aldehyde group in the presence of the cross-linking agent of formula (I).

11. A composition according to claim 3, wherein the polymerisable functional group has a formula *—C=CH$_2$ where * is the rest of the monomer precursor to a polymer of interest, the monomer comprising at least one pending imine group, a cross-linking agent comprising a monomer or monomers comprising at least an aldehyde group or the cross-linking agent of formula (I), as applicable.

12. A composition according to claim 2, wherein the cross-linking agent is a polymer carrying
   aldehyde functional groups; or
   pending imine functional groups linked to the polymer by the carbon atom; or
   pending imine functional groups linked to the polymer by the nitrogen atom; or
   aldehyde functional groups and pending imine functional groups linked to the polymer by the carbon atom.

13. A composition according to claim 1, wherein the cross-linking agent is a monomer that comprises at least one pending imine group and carries a functional group that is polymerisable by radical polymerisation, and the imine function is linked to the polymerisable group by the nitrogen atom.

14. A composition according to claim 1, wherein the carbon atom of the imine functions and the carbon atom of the aldehyde functions are linked directly to an aryl or heteroaryl group or to the alkene function of a terpenoid.

15. A composition according to claim 1, wherein the polymerisation is in addition carried out in the presence of monomers comprising at least one aldehyde group when monomers (b) are monomers comprising at least one pending imine group or in the presence of monomers comprising at least one pending imine group when monomers (b) are monomers comprising at least one pending aldehyde group.

16. A composition according to claim 1, wherein the polymer is prepared by polymerisation of monomers that are precursors to polymers of interest, of monomers comprising at least one pending imine group, in said monomers the imine function is linked to the polymerisable group by the carbon atom, and of the cross-linking agent comprising a monomer comprising an imine group linked to the polymerisable group by the nitrogen atom.

17. A composition according to claim 1, wherein the polymer is prepared by polymerisation of monomers that are precursors to polymers of interest and of monomers comprising at least one pending imine group in which the imine function is linked to the polymerisable group by the carbon atom, in the presence of a cross-linking agent without a polymerisable group.

18. A composition according to claim 1, wherein the polymer is prepared by polymerisation of monomers that are precursors to polymers of interest, of monomers comprising at least one pending imine group, in said monomers the imine function is linked to the polymerisable group by the carbon atom, of monomers comprising at least one aldehyde group, and of the cross-linking agent comprising a monomer comprising an imine group linked to the polymerisable group by the nitrogen atom.

19. A composition according to claim 1, wherein the polymer is prepared by polymerisation of monomers that are precursors to polymers of interest and of monomers comprising at least one pending imine group in which the imine function is linked to the polymerisable group by the carbon atom, and of monomers comprising at least one pending aldehyde group, in the presence of a cross-linking agent without a polymerisable group.

20. A composition according to claim 1, wherein the polymer is prepared by polymerisation of monomers that are precursors to polymers of interest, of monomers comprising at least one aldehyde group, and of the cross-linking agent comprising a monomer comprising an imine group linked to the polymerisable group by the nitrogen atom.

21. A composition according to claim 1, wherein the polymer is prepared by polymerisation of monomers that are precursors to polymers of interest, and of monomers comprising at least one aldehyde group, in the presence of a cross-linking agent without a polymerisable group.

22. A composition according to claim 1, wherein the polymerisation is in addition carried out in the presence of a aldehyde or polyaldehyde that is non-polymerisable.

23. A composition according to claim 1, wherein the monomer precursors of interest are thermoplastic polymer precursors or thermosetting polymer precursors.

24. A composition according to claim 1, wherein the monomers that are precursors of polymers of interest are selected from the group consisting of styrene and its derivatives, alkyl methacrylates, arylalkyl methacrylates, alkyl acrylates, arylalkyl acrylates, acrylonitrile, acrylamides, methacrylamides, ethylene, fluoroalkyl methacrylates, fluoroalkyl acrylates, halogenated alkenes, alkyl dienes, vinyl acetate, vinyl chloride, vinylidene fluoride, maleic anhydride, maleimides, N-vinylpyrrolidone, 2-vinylpyridine, 4-vinylpyridine, N-vinylcarbazole and mixtures thereof.

25. A composition according to claim 1, wherein the polymerisable functional group is a —C=C— double bond.

26. A method to catalyse imine-imine metathesis reactions and imine-aldehyde exchange reactions, comprising adding an aldehyde in a composition comprising imine-functionalized compounds, wherein the composition is the composition of claim 1.

27. A material obtained from the composition according to claim 1.

28. A preparation process of a material obtained from the composition according to claim 1, comprising the following steps:
  Preparation of a composition according to claim 1 by radical copolymerisation of the compounds defined in claim 1;
  Shaping of the composition obtained at the radical copolymerisation step.

29. A formulation including a composition according to claim 1.

* * * * *